US008119012B2

(12) United States Patent
Bahm et al.

(10) Patent No.: US 8,119,012 B2
(45) **Date of Patent: *Feb. 21, 2012**

(54) WATER FILTER MATERIALS AND WATER FILTERS CONTAINING A MIXTURE OF MICROPOROUS AND MESOPOROUS CARBON PARTICLES

(75) Inventors: Jeannine Rebecca Bahm, Milford, OH (US); Andrew Thomas Pearks, Cincinnati, OH (US); Guillermo Matias Vidal, Cincinnati, OH (US); Dimitris Ioannis Collias, Mason, OH (US); Michael Donovan Mitchell, Cincinnati, OH (US); Robert E. Astle, Middlefield, CT (US); Katharine L. K. Faye, Moodus, CT (US); Robert Andrew Governal, Middletown, CT (US); Thomas J. Hamlin, Vernon, CT (US); Rebecca A. Lucht, Rocky Hill, CT (US); Hemang Patel, Wallingford, CT (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,981

(22) Filed: Mar. 7, 2011

(65) Prior Publication Data

US 2011/0155661 A1 Jun. 30, 2011

Related U.S. Application Data

(60) Continuation of application No. 12/501,216, filed on Jul. 10, 2009, now Pat. No. 7,922,008, (Continued)

(51) Int. Cl.
*B01D 37/00* (2006.01)
*B01D 39/14* (2006.01)
*B01D 35/00* (2006.01)
*B01D 27/00* (2006.01)

(52) U.S. Cl. .................... 210/767; 210/501; 210/502.1; 210/503; 210/504; 210/505; 210/506; 210/507; 210/508

(58) Field of Classification Search ................. 210/266, 210/501, 502.1, 503, 504, 505, 506, 507, 210/508
See application file for complete search history.

(56) References Cited

U.S. PATENT DOCUMENTS 25,398 A 9/1859 Duchamp (Continued)

FOREIGN PATENT DOCUMENTS

DE 3020615 12/1980

(Continued)

OTHER PUBLICATIONS

U.S. Appl. No. 09/574,456, filed May 19, 2000, Tremblay et al.

(Continued)

*Primary Examiner* — John Kim
(74) *Attorney, Agent, or Firm* — Amanda T. Barry; Cynthia L. Clay

(57) ABSTRACT

A filter and filter material for providing or treating potable water is provided. The filter includes a housing having an inlet and an outlet, a filter material disposed within the housing, the filter material formed at least in part from a mixture of a plurality of mesoporous and microporous activated carbon particles. Preferably, at least some of the mesoporous activated carbon filter particles are coated with a cationic polymer, and even more preferably, at least some of the particles are coated with a cationic polymer and silver or a silver containing material. Kits comprising filters and information relating to the reduction, killing or removal of bacteria, viruses, microbials, and TTHM are also provided.

20 Claims, 1 Drawing Sheet

24
28
20
22
26

Related U.S. Application Data which is a division of application No. 12/211,200, filed on Sep. 16, 2008, now Pat. No. 7,712,613, which is a division of application No. 11/119,120, filed on Apr. 29, 2005, now abandoned, which is a continuation of application No. 11/101,130, filed on Apr. 7, 2005, now abandoned, and a continuation-in-part of application No. 10/705,572, filed on Nov. 11, 2003, now Pat. No. 7,614, 508, and a continuation-in-part of application No. 10/705,174, filed on Nov. 11, 2003, now Pat. No. 7,614, 507, said application No. 10/705,572 is a continuation-in-part of application No. 10/464,209, filed on Jun. 18, 2003, now abandoned, and a continuation-in-part of application No. 10/464,210, filed on Jun. 18, 2003, now Pat. No. 7,614,506, which is a continuation-in-part of application No. 09/935,962, filed on Aug. 23, 2001, now abandoned, which is a continuation-in-part of application No. 09/935,810, filed on Aug. 23, 2001, now abandoned, application No. 13/041,981, which is a continuation-in-part of application No. PCT/US03/05416, filed on Feb. 21, 2003, and a continuation-in-part of application No. PCT/US03/05409, filed on Feb. 21, 2003.

(56) References Cited

U.S. PATENT DOCUMENTS 9,622 A 3/1881 Best
531,838 A 1/1895 Davis et al.
543,922 A 8/1895 Buckley
590,020 A 9/1897 Myers
602,883 A 4/1898 Tyden
611,691 A 10/1898 Langdon et al.
673,722 A 5/1901 Moulton
34,658 A 6/1901 Weaver
826,654 A 7/1906 Firth
963,324 A 7/1910 Randall
967,905 A 8/1910 Hagg
41,321 A 4/1911 Anderson
1,043,933 A 11/1912 Hildebrand
1,363,589 A 12/1920 Hartman
1,539,775 A 5/1925 Sauer
1,579,158 A 3/1926 Smile
1,621,684 A 3/1927 Rabjohn et al.
1,674,203 A 6/1928 Holz et al.
D76,391 S 9/1928 Groak
1,752,060 A 3/1930 Burright et al.
1,782,850 A 11/1930 Hill
1,806,977 A 5/1931 Kenney
D93,910 S 11/1934 Camp
D113,679 S 3/1939 Neely
D128,316 S 7/1941 Roffy
2,268,076 A 12/1941 Lawlor
D133,177 S 7/1942 Gross
D136,021 S 7/1943 Kraissl, Jr.
2,335,458 A 11/1943 Senyal
2,372,340 A 3/1945 Senyal
D143,545 S 1/1946 Pond et al.
2,633,990 A 4/1953 Simpson et al.
D170,472 S 9/1953 Monsarrat
D173,603 S 12/1954 Atkinson
2,701,792 A 2/1955 Owen
2,750,080 A 6/1956 Blanchard et al.
2,811,258 A 10/1957 Schleyer et al.
2,987,187 A 6/1961 Comroe
D196,108 S 8/1963 Gerber
3,184,064 A 5/1965 Sampson et al.
3,242,073 A 3/1966 Guebert et al.
3,268,444 A 8/1966 Renn
3,278,560 A 10/1966 Gaertner
3,283,040 A 11/1966 Stover
3,314,897 A 4/1967 Gaertner
3,333,703 A 8/1967 Scavuzzo
D208,752 S 9/1967 Payne
3,342,335 A 9/1967 Gamundi et al.
3,352,424 A 11/1967 Guebert et al.
3,419,645 A 12/1968 Pietzka et al.
3,428,089 A 2/1969 Kachergis
D216,978 S 3/1970 Greene
3,539,009 A 11/1970 Kudlaty
3,550,782 A 12/1970 Veloz
3,558,276 A 1/1971 Otani
3,572,553 A 3/1971 Ogden
3,591,010 A 7/1971 Pall et al.
D221,850 S 9/1971 Anderson
3,670,892 A 6/1972 Baerg et al.
3,678,098 A 7/1972 Lewis et al.
3,686,151 A 8/1972 Keim
3,692,180 A 9/1972 LaRaus
3,700,623 A 10/1972 Keim
D227,565 S 7/1973 Ehret
D227,886 S 7/1973 Martinez
D229,178 S 11/1973 Mixon
3,770,625 A 11/1973 Wallis et al.
3,784,649 A 1/1974 Buckman et al.
3,814,642 A 6/1974 Araki et al.
D232,550 S 8/1974 Fushihara
3,836,458 A 9/1974 Walls et al.
3,847,787 A 11/1974 Okazaki et al.
3,853,761 A 12/1974 McClory
3,856,676 A 12/1974 Grimme et al.
D234,356 S 2/1975 Holben et al.
D234,357 S 2/1975 Humphrey
3,871,950 A 3/1975 Hashina et al.
D234,843 S 4/1975 Taylor
D235,143 S 5/1975 Ehret
D235,206 S 5/1975 Bertrand
3,886,093 A 5/1975 Dimitri
3,888,958 A 6/1975 Juntgen et al.
D236,263 S 8/1975 Dussardier et al.
D236,264 S 8/1975 Taylor
D236,265 S 8/1975 Dussardier
3,898,188 A 8/1975 Rembaum et al.
D236,829 S 9/1975 Berry, Jr. et al.
3,931,009 A 1/1976 Davis
3,939,074 A 2/1976 Bray
3,950,253 A 4/1976 Stern
3,950,267 A 4/1976 Arakawa et al.
D240,624 S 7/1976 MacMurray
D240,731 S 7/1976 Free et al.
3,972,818 A 8/1976 Bokros
D242,043 S 10/1976 Corder et al.
D242,249 S 11/1976 Corder et al.
4,007,114 A 2/1977 Ostreicher
4,014,792 A 3/1977 Gossett et al.
4,019,986 A 4/1977 Burris et al.
4,021,343 A 5/1977 Tyler
4,045,553 A 8/1977 Mitsumori et al.
4,049,550 A 9/1977 Obidniak
4,081,370 A 3/1978 Schmitt, Jr. et al.
4,086,166 A 4/1978 Martin
D249,053 S 8/1978 Hansrote
D249,054 S 8/1978 Hansrote
D249,055 S 8/1978 Hansrote
D249,057 S 8/1978 Hansrote
4,110,219 A 8/1978 Maples
D249,275 S 9/1978 Mackay et al.
D249,701 S 9/1978 Maples et al.
D251,380 S 3/1979 Casamitjana
4,147,631 A 4/1979 Deines et al.
4,152,262 A 5/1979 Rose
4,172,796 A 10/1979 Corder
D253,715 S 12/1979 Emery
4,181,694 A 1/1980 Hashino et al.
4,190,532 A 2/1980 Halbfoster
4,190,537 A 2/1980 Tondreau et al.
4,205,055 A 5/1980 Maire et al.
D256,944 S 9/1980 Fox, Jr.
4,252,650 A 2/1981 Mas et al.
D258,462 S 3/1981 Mixon
4,277,333 A 7/1981 Coppola
4,283,283 A 8/1981 Zimmerman 4,292,417 A 9/1981 Ishii et al.
4,305,782 A 12/1981 Ostreicher et al.
4,309,247 A 1/1982 Hou et al.
4,321,288 A 3/1982 Ostreicher
4,340,479 A 7/1982 Pall
4,340,480 A 7/1982 Pall et al.
4,352,884 A 10/1982 Nakashima et al.
4,361,486 A 11/1982 Hou et al.
4,366,068 A 12/1982 Ostreicher et al.
4,368,123 A 1/1983 Stanley
D268,866 S 5/1983 Desai et al.
4,389,311 A 6/1983 La Freniere
4,391,712 A 7/1983 Tyler et al.
4,396,512 A 8/1983 Beauman et al.
4,399,035 A 8/1983 Nohmi et al.
4,430,226 A 2/1984 Hedge et al.
4,434,206 A 2/1984 Fukuda et al.
4,448,695 A 5/1984 Gordon, Jr. et al.
D274,930 S 7/1984 Joe
4,473,474 A 9/1984 Ostreicher et al.
4,482,641 A 11/1984 Wennerberg
4,504,389 A 3/1985 Rundzaitis
D278,650 S 4/1985 Slovak et al.
4,515,692 A 5/1985 Chandler et al.
4,523,995 A 6/1985 Pall et al.
4,552,863 A 11/1985 Fujimori
D282,767 S 2/1986 Shofner
4,572,785 A 2/1986 Braaten
4,573,464 A 3/1986 Yo
4,576,929 A 3/1986 Shimazaki
4,578,150 A 3/1986 Hou
4,585,554 A 4/1986 Burrows
4,595,497 A 6/1986 Burrows
4,606,828 A 8/1986 Wells
4,609,466 A 9/1986 McCausland et al.
4,623,451 A 11/1986 Oliver
4,623,467 A 11/1986 Hamlin
4,626,346 A 12/1986 Hall
D288,115 S 2/1987 McCausland et al.
4,645,567 A 2/1987 Hou et al.
4,654,075 A 3/1987 Cipollini
D289,429 S 4/1987 Thumberger
4,657,674 A 4/1987 Burrows
D290,386 S 6/1987 Padilla
D290,638 S 6/1987 Bishop
4,670,144 A 6/1987 McCausland et al.
4,670,482 A 6/1987 Dilling
4,673,504 A 6/1987 Ostreicher et al.
4,678,565 A 7/1987 Norton
4,681,677 A 7/1987 Kuh et al.
4,683,054 A 7/1987 Turnbull
4,686,037 A 8/1987 Lang
4,695,375 A 9/1987 Tyler
4,696,742 A 9/1987 Shimazaki
D292,429 S 10/1987 Spink
4,698,164 A 10/1987 Ellis
4,704,324 A 11/1987 Davis et al.
4,708,803 A 11/1987 Ostreicher et al.
D293,367 S 12/1987 Spink
4,722,964 A 2/1988 Chan et al.
4,734,208 A 3/1988 Pall et al.
4,734,394 A 3/1988 Kosaka et al.
D295,887 S 5/1988 Hopkins
D296,000 S 5/1988 Padilla
4,743,366 A 5/1988 Burrows
4,744,895 A 5/1988 Gales et al.
D296,352 S 6/1988 Luzenberg
D296,463 S 6/1988 Padilla
4,749,484 A 6/1988 Greenhut
4,752,389 A 6/1988 Burrows
4,759,844 A 7/1988 Lipschultz et al.
D297,349 S 8/1988 Kronsbein
4,769,148 A 9/1988 Fibiger et al.
4,772,455 A 9/1988 Izumi et al.
4,772,508 A 9/1988 Brassell
4,775,465 A 10/1988 Burrows
4,776,952 A 10/1988 Burrows
4,778,596 A 10/1988 Linder et al.
4,808,302 A 2/1989 Beall, Jr.
4,816,149 A 3/1989 Wekell
4,822,765 A 4/1989 Nishimura
4,828,698 A 5/1989 Jewell et al.
4,830,223 A 5/1989 Priest
4,830,744 A 5/1989 Burrows
4,831,011 A 5/1989 Oikawa et al.
D301,913 S 6/1989 Brown et al.
4,842,724 A 6/1989 Bray et al.
4,853,117 A 8/1989 Burrows
4,859,340 A 8/1989 Hou et al.
D303,703 S 9/1989 Padilla et al.
D304,363 S 10/1989 Ruesch
4,879,027 A 11/1989 Sanders
4,880,535 A 11/1989 Burrows
4,885,081 A 12/1989 Oliver
4,885,085 A 12/1989 Beall, Jr.
D306,754 S 3/1990 Petrucci et al.
D307,173 S 4/1990 Boehnke
4,915,839 A 4/1990 Marinaccio et al.
D307,933 S 5/1990 Baer
4,923,091 A 5/1990 Sutera
4,936,984 A 6/1990 Blandford et al.
D309,487 S 7/1990 Lieberman
D309,494 S 7/1990 Riley
4,946,600 A 8/1990 Shin
4,968,440 A 11/1990 Woodruff
4,969,991 A 11/1990 Valadez
4,969,996 A 11/1990 Hankammer
D312,679 S 12/1990 Carrano et al.
4,978,650 A 12/1990 Coughlin et al.
D314,226 S 1/1991 Devine et al.
4,981,591 A 1/1991 Ostreicher
4,983,288 A 1/1991 Karbachsch et al.
4,983,717 A 1/1991 Yamasaki et al.
D314,607 S 2/1991 Kapec et al.
4,994,184 A 2/1991 Thalmann et al.
4,997,553 A 3/1991 Clack
5,004,535 A 4/1991 Bosko et al.
5,017,292 A 5/1991 DiLeo et al.
5,024,764 A 6/1991 Holler
D318,092 S 7/1991 Ferguson
D318,093 S 7/1991 Ferguson
D318,315 S 7/1991 Sanborn
5,035,802 A 7/1991 Yamasaki et al.
D319,288 S 8/1991 Spokoiny
5,037,547 A 8/1991 Burrows
5,037,550 A 8/1991 Montagnon et al.
5,039,402 A 8/1991 Himelstein
D319,864 S 9/1991 Geneve et al.
5,049,270 A 9/1991 Carrano et al.
5,051,189 A 9/1991 Farrah
D321,550 S 11/1991 Laughlen et al.
5,068,030 A 11/1991 Chen
5,069,782 A 12/1991 Moyher, Jr. et al.
D323,017 S 1/1992 Bernstein
D323,203 S 1/1992 Pedersen
5,078,864 A 1/1992 Whittier
5,082,557 A 1/1992 Grayson et al.
5,083,442 A 1/1992 Vlock
5,091,164 A 2/1992 Takabatake
D324,721 S 3/1992 Kapec et al.
5,106,500 A 4/1992 Hembree et al.
5,108,590 A 4/1992 DiSanto
5,110,468 A 5/1992 Miyashita et al.
5,111,966 A 5/1992 Fridman
5,112,477 A 5/1992 Hamlin
5,114,042 A 5/1992 Sutera
5,116,502 A 5/1992 Ferguson
D326,706 S 6/1992 Karlsson
5,122,265 A 6/1992 Mora et al.
5,128,034 A 7/1992 Kool
5,128,036 A 7/1992 Svensson
5,131,277 A 7/1992 Birdsong et al.
5,133,878 A 7/1992 Gsell et al.
D328,777 S 8/1992 Thalmann et al.
5,143,889 A 9/1992 Takahiro et al.
5,147,533 A 9/1992 Lipshultz et al.
D330,587 S 10/1992 Seeley
5,160,608 A 11/1992 Norton D331,446 S 12/1992 Gidman
D332,131 S 12/1992 Chez
5,183,607 A 2/1993 Beall et al.
5,187,237 A 2/1993 Nordmann et al.
5,188,727 A 2/1993 Kurth et al.
5,189,092 A 2/1993 Koslow
5,193,892 A 3/1993 Swindell
5,203,803 A 4/1993 Schoenmeyr
5,204,310 A 4/1993 Tolles et al.
D336,760 S 6/1993 Raunkjaer
5,223,132 A 6/1993 Yoon
5,227,238 A 7/1993 Hirai et al.
5,232,590 A 8/1993 Reid
5,238,559 A 8/1993 Nieweg
5,238,570 A 8/1993 Hugi et al.
5,248,417 A 9/1993 Reid
D340,967 S 11/1993 Muir
5,261,792 A 11/1993 Schoenmeyr
5,268,093 A 12/1993 Hembree et al.
5,277,805 A 1/1994 Ferguson
5,281,309 A 1/1994 Greene
D344,322 S 2/1994 Kasner et al.
5,282,972 A 2/1994 Hanna et al.
5,290,442 A 3/1994 Clack
5,296,148 A 3/1994 Colangelo et al.
D347,462 S 5/1994 Douglas
5,308,703 A 5/1994 Tsujimoto et al.
5,310,593 A 5/1994 Tsujimoto et al.
5,316,673 A 5/1994 Kohlmann et al.
5,322,625 A 6/1994 Rise
5,324,424 A 6/1994 Hochgatterer
5,324,434 A 6/1994 Oikawa et al.
5,328,613 A 7/1994 Beall et al.
5,331,037 A 7/1994 Koslow
D350,870 S 9/1994 Hansen
D351,014 S 9/1994 Hansen
5,348,647 A 9/1994 Chen
5,349,992 A 9/1994 Gallo et al.
5,356,531 A 10/1994 Rantz
D352,200 S 11/1994 Hansen
5,368,197 A 11/1994 Sutera
D353,440 S 12/1994 Ito et al.
5,371,221 A 12/1994 Sipos et al.
5,376,279 A 12/1994 Judd et al.
5,393,419 A 2/1995 Tiede et al.
D356,625 S 3/1995 Petrucci et al.
5,395,509 A 3/1995 Guerra Cisneros et al.
D357,058 S 4/1995 Engelhard
D358,460 S 5/1995 Wren
D358,868 S 5/1995 Hembree et al.
D360,332 S 7/1995 Mann
5,431,813 A 7/1995 Daniels
5,435,909 A 7/1995 Burrows
5,443,739 A 8/1995 Vogel et al.
5,445,729 A 8/1995 Monroe et al.
5,446,005 A 8/1995 Endo
5,447,626 A 9/1995 Ido
5,449,456 A 9/1995 Bowman
D363,760 S 10/1995 Morem et al.
5,454,944 A 10/1995 Clack
5,460,792 A 10/1995 Rosenbaum
5,464,531 A 11/1995 Greene
5,466,378 A 11/1995 Dussert et al.
5,468,387 A 11/1995 Solomon
5,478,465 A 12/1995 Larson et al.
5,487,917 A 1/1996 Gadkaree
5,502,978 A 4/1996 Field
5,505,120 A 4/1996 Albertson
5,518,613 A 5/1996 Koczur et al.
5,521,008 A 5/1996 Lieberman et al.
D370,521 S 6/1996 Archer et al.
5,525,214 A 6/1996 Hembree
5,527,451 A 6/1996 Hembree et al.
D372,295 S 7/1996 Weber
5,536,394 A 7/1996 Lund et al.
5,536,395 A 7/1996 Kuennen et al.
5,536,396 A 7/1996 Mudra et al.
D372,515 S 8/1996 Douglas
D372,760 S 8/1996 Brancazio et al.
5,543,054 A 8/1996 Charkoudian et al.
5,560,393 A 10/1996 Clack
5,562,824 A 10/1996 Magnusson
5,565,100 A 10/1996 Deng
5,567,311 A 10/1996 Jang
5,580,444 A 12/1996 Burrows
5,582,717 A 12/1996 Di Santo
5,587,089 A 12/1996 Vogel et al.
D377,388 S 1/1997 Weber et al.
D377,515 S 1/1997 Hembree et al.
5,607,595 A 3/1997 Hiasa et al.
D378,883 S 4/1997 Magnusson
5,620,790 A 4/1997 Holzki et al.
5,626,749 A 5/1997 Lambert et al.
5,639,374 A 6/1997 Monroe et al.
5,643,444 A 7/1997 Garrigues et al.
5,645,719 A 7/1997 Ha et al.
5,645,720 A 7/1997 Godines
5,656,160 A 8/1997 Parise et al.
5,658,372 A 8/1997 Gadkaree
5,658,457 A 8/1997 Schoenmeyr
D383,192 S 9/1997 Johnson
5,662,779 A 9/1997 Greene et al.
5,662,792 A 9/1997 Suh
5,665,224 A 9/1997 Levene et al.
5,670,124 A 9/1997 Itoga et al.
5,676,824 A 10/1997 Jeon et al.
5,679,243 A 10/1997 Cho
5,679,248 A 10/1997 Blaney
5,681,459 A 10/1997 Bowman
D386,242 S 11/1997 Clack et al.
5,686,893 A 11/1997 Jeon
5,688,588 A 11/1997 Cotton et al.
5,698,091 A 12/1997 Kuennen et al.
5,702,498 A 12/1997 Huang
D389,004 S 1/1998 Hampshire et al.
5,705,067 A 1/1998 Sumi et al.
5,705,269 A 1/1998 Pimenov et al.
5,707,518 A 1/1998 Coates et al.
5,709,794 A 1/1998 Emmons et al.
D390,629 S 2/1998 Ullmann
5,715,699 A 2/1998 Coates et al.
5,730,863 A 3/1998 Howlings et al.
5,744,236 A 4/1998 Rohrbach et al.
5,750,026 A 5/1998 Gadkaree et al.
5,755,957 A 5/1998 Jeon
D395,705 S 6/1998 Ediger et al.
5,762,787 A 6/1998 Park et al.
5,762,797 A 6/1998 Patrick et al.
5,766,453 A 6/1998 Morellato et al.
5,772,896 A 6/1998 Denkewicz et al.
5,773,143 A 6/1998 Vermilion et al.
5,776,339 A 7/1998 Ha et al.
5,776,385 A 7/1998 Gadkaree et al.
5,785,848 A 7/1998 Strand
5,795,475 A 8/1998 Luedke et al.
5,795,843 A 8/1998 Endo
D398,367 S 9/1998 Andrepont et al.
5,800,707 A 9/1998 Mehnert et al.
5,804,280 A 9/1998 Pall et al.
5,813,245 A 9/1998 Coates et al.
5,813,246 A 9/1998 Oh
5,817,231 A 10/1998 Souza
5,817,237 A 10/1998 Lee et al.
5,833,849 A 11/1998 Primdahl
5,834,114 A 11/1998 Economy et al.
D402,745 S 12/1998 Termeer et al.
D403,406 S 12/1998 Douglas
5,853,572 A 12/1998 Kuennen et al.
5,855,788 A 1/1999 Everhart et al.
5,855,796 A 1/1999 Joung
D405,156 S 2/1999 Vanderhoef
D405,867 S 2/1999 Denkewicz, Jr. et al.
D405,868 S 2/1999 Denkewicz, Jr. et al.
D406,314 S 3/1999 Denkewicz, Jr. et al.
D407,462 S 3/1999 Bishop et al.
5,882,507 A 3/1999 Tanner et al.
D409,715 S 5/1999 Cruz et al.
5,900,138 A 5/1999 Moretto

| | | | |
|---|---|---|---|
| 5,900,141 | A | 5/1999 | Takigawa et al. |
| 5,900,143 | A | 5/1999 | Dalton et al. |
| 5,904,854 | A | 5/1999 | Shmidt et al. |
| D410,726 | S | 6/1999 | Cook |
| 5,907,958 | A | 6/1999 | Coates et al. |
| 5,922,378 | A | 7/1999 | Kagan et al. |
| 5,922,803 | A | 7/1999 | Koslow et al. |
| 5,928,503 | A | 7/1999 | Shang-Chun |
| 5,928,506 | A | 7/1999 | Bae |
| 5,928,588 | A | 7/1999 | Chen et al. |
| 5,935,426 | A | 8/1999 | Giordano et al. |
| 5,957,034 | A | 9/1999 | Sham et al. |
| 5,957,339 | A | 9/1999 | Deni et al. |
| 5,972,253 | A | 10/1999 | Kimber |
| D416,307 | S | 11/1999 | Williams |
| 5,976,363 | A | 11/1999 | Monroe et al. |
| 5,989,425 | A | 11/1999 | Yonezawa et al. |
| 5,989,736 | A | 11/1999 | Lintz et al. |
| 5,990,041 | A | 11/1999 | Chung et al. |
| 5,992,684 | A | 11/1999 | Russell |
| D418,198 | S | 12/1999 | Bainton |
| 5,997,734 | A | 12/1999 | Koski et al. |
| 6,001,249 | A | 12/1999 | Bailey et al. |
| 6,013,180 | A | 1/2000 | Wang |
| D421,089 | S | 2/2000 | Fujita et al. |
| 6,024,899 | A | 2/2000 | Peng et al. |
| 6,030,698 | A | 2/2000 | Burchell et al. |
| D422,679 | S | 4/2000 | Burrows |
| 6,045,694 | A | 4/2000 | Wang et al. |
| D424,660 | S | 5/2000 | Teran et al. |
| 6,057,262 | A | 5/2000 | Derbyshire et al. |
| D426,418 | S | 6/2000 | Norvell et al. |
| 6,077,588 | A | 6/2000 | Koslow et al. |
| D429,943 | S | 8/2000 | Yu |
| 6,099,735 | A | 8/2000 | Kelada |
| 6,103,114 | A | 8/2000 | Tanner et al. |
| 6,120,682 | A | 9/2000 | Cook |
| 6,120,683 | A | 9/2000 | Reinhart et al. |
| 6,120,685 | A | 9/2000 | Carlson et al. |
| 6,123,837 | A | 9/2000 | Wadsworth et al. |
| 6,123,844 | A | 9/2000 | Haney |
| 6,139,726 | A | 10/2000 | Greene |
| 6,145,670 | A | 11/2000 | Risser |
| 6,155,432 | A | 12/2000 | Wilson et al. |
| 6,177,319 | B1 | 1/2001 | Cheng |
| D437,402 | S | 2/2001 | Gieseke et al. |
| D437,913 | S | 2/2001 | Adam et al. |
| D438,282 | S | 2/2001 | Liu |
| D440,255 | S | 4/2001 | Dickson |
| 6,214,224 | B1 | 4/2001 | Farley |
| 6,228,255 | B1 | 5/2001 | Peterson et al. |
| 6,228,803 | B1 | 5/2001 | Gadkaree et al. |
| 6,241,893 | B1 | 6/2001 | Levy |
| 6,241,899 | B1 | 6/2001 | Ramos |
| 6,245,229 | B1 | 6/2001 | Kool et al. |
| 6,258,265 | B1 | 7/2001 | Jones |
| 6,258,266 | B1 | 7/2001 | Riback et al. |
| 6,264,830 | B1 | 7/2001 | Plester et al. |
| D446,840 | S | 8/2001 | Strand |
| 6,270,658 | B1 | 8/2001 | Plüss |
| 6,270,822 | B1 | 8/2001 | Frazier |
| 6,274,041 | B1 | 8/2001 | Williamson et al. |
| D449,758 | S | 10/2001 | Norvell et al. |
| 6,303,031 | B1 | 10/2001 | Senner |
| 6,328,881 | B1 | 12/2001 | Larkner et al. |
| 6,337,015 | B1 | 1/2002 | Poirier |
| D454,615 | S | 3/2002 | Neal |
| 6,361,686 | B1 | 3/2002 | Conrad |
| 6,370,884 | B1 | 4/2002 | Kelada |
| 6,391,191 | B2 | 5/2002 | Conrad |
| 6,402,949 | B1 | 6/2002 | Banks |
| 6,423,212 | B1 | 7/2002 | Bosko |
| 6,428,687 | B1 | 8/2002 | Moretto |
| 6,428,708 | B1 | 8/2002 | Halemba et al. |
| 6,436,282 | B1 | 8/2002 | Gundrum et al. |
| D465,018 | S | 10/2002 | Gustafsson et al. |
| D466,602 | S | 12/2002 | Gieseke et al. |
| 6,491,811 | B2 | 12/2002 | Conrad et al. |
| 6,491,815 | B2 | 12/2002 | Conrad et al. |
| 6,565,749 | B1 | 5/2003 | Hou et al. |
| 6,579,445 | B2 | 6/2003 | Nachtman et al. |
| 6,630,016 | B2 | 10/2003 | Koslow |
| 6,660,166 | B2 | 12/2003 | Tremblay et al. |
| 6,827,854 | B2 | 12/2004 | Mitchell et al. |
| 6,881,348 | B2 | 4/2005 | Cannon et al. |
| 7,614,506 | B2 | 11/2009 | Mitchell et al. |
| 7,614,507 | B2 | 11/2009 | Mitchell et al. |
| 7,614,508 | B2 | 11/2009 | Mitchell et al. |
| 7,615,152 | B2 | 11/2009 | Tanner et al. |
| 7,712,613 | B2 | 5/2010 | Bahm et al. |
| 7,740,765 | B2 | 6/2010 | Mitchell et al. |
| 7,740,766 | B2 | 6/2010 | Mitchell et al. |
| 7,749,394 | B2 | 7/2010 | Mitchell et al. |
| 7,850,859 | B2 | 12/2010 | Tanner et al. |
| 2001/0032823 | A1 | 10/2001 | Plester et al. |
| 2002/0011434 | A1 | 1/2002 | Kuennen et al. |
| 2002/0014461 | A1 | 2/2002 | Kuennen et al. |
| 2002/0033365 | A1 | 3/2002 | Patil |
| 2002/0043491 | A1 | 4/2002 | Janik et al. |
| 2002/0060177 | A1 | 5/2002 | Conrad |
| 2002/0074294 | A1 | 6/2002 | Tremblay et al. |
| 2002/0134714 | A1 | 9/2002 | Ozeki et al. |
| 2002/0148785 | A1 | 10/2002 | Mitchell et al. |
| 2002/0150686 | A1 | 10/2002 | Mitchell et al. |
| 2002/0170618 | A1 | 11/2002 | Pluta et al. |
| 2002/0170921 | A1 | 11/2002 | Tan et al. |
| 2002/0172637 | A1 | 11/2002 | Chesneau et al. |
| 2003/0038084 | A1 | 2/2003 | Mitchell et al. |
| 2003/0096703 | A1 | 5/2003 | Mitchell et al. |
| 2003/0106851 | A1 | 6/2003 | Tremblay et al. |
| 2003/0136728 | A1 | 7/2003 | Jagtoyen et al. |
| 2003/0217963 | A1 | 11/2003 | Mitchell et al. |
| 2004/0040906 | A1 | 3/2004 | Jagtoyen et al. |
| 2004/0129617 | A1 | 7/2004 | Tanner et al. |
| 2004/0159596 | A1 | 8/2004 | Mitchell et al. |
| 2004/0164018 | A1 | 8/2004 | Mitchell et al. |
| 2004/0251190 | A1 | 12/2004 | Cumberland |
| 2008/0093303 | A1 | 4/2008 | Tremblay et al. |

FOREIGN PATENT DOCUMENTS

| | | | |
|---|---|---|---|
| DE | 3511389 | | 5/1985 |
| DE | 3738231 | | 5/1989 |
| DE | 3914940 | | 11/1990 |
| DE | 4028529 | | 3/1992 |
| DE | 4116128 | | 11/1992 |
| DE | 93 12 279 | | 10/1993 |
| DE | 19650191 | | 8/1998 |
| DE | 19717579 | | 10/1998 |
| DE | 10016365 | | 10/2001 |
| EP | 0 285 321 | A2 | 3/1988 |
| EP | 0 364 111 | A1 | 4/1990 |
| EP | 0 366 539 | A2 | 5/1990 |
| EP | 367389 | | 5/1990 |
| EP | 0 439 005 | A1 | 7/1991 |
| EP | 0 490 317 | | 6/1992 |
| EP | 0 551 864 | A1 | 7/1993 |
| EP | 0563027 | | 6/1994 |
| EP | 0616975 | A2 | 9/1994 |
| EP | 0 792 676 | A1 | 9/1997 |
| EP | 0 798 003 | A2 | 10/1997 |
| EP | 0880986 | A2 | 12/1998 |
| EP | 0947231 | A1 | 10/1999 |
| EP | 0891952 | | 6/2000 |
| EP | 1106228 | | 6/2001 |
| EP | 0668243 | B1 | 9/2001 |
| EP | 1 419 109 | | 12/2005 |
| FR | 2331 515 | | 6/1977 |
| FR | 2557807 | | 7/1985 |
| FR | 2788511 | | 7/2000 |
| GB | 191594 | | 1/1923 |
| GB | 1163426 | | 9/1969 |
| GB | 1202215 | | 8/1970 |
| GB | 1470874 | | 4/1977 |
| GB | 1546409 | | 5/1979 |
| GB | 2 029 255 | A | 3/1980 |
| GB | 2 051 770 | A | 1/1981 |
| GB | 2238532 | A | 6/1991 |
| GB | 2250281 | A | 6/1992 |

| | | | |
|---|---|---|---|
| GB | 2 257 429 | A | 1/1993 |
| GB | 2 311 775 | A | 10/1997 |
| GB | 2311775 | A | 10/1997 |
| JP | 58 131 187 | A2 | 8/1983 |
| JP | 1 304 095 | A | 12/1989 |
| JP | 04 247 233 | A2 | 9/1992 |
| JP | 4-277080 | | 10/1992 |
| JP | 05049921 | | 3/1993 |
| JP | 05 253 478 | A2 | 10/1993 |
| JP | 07 080 449 | A2 | 3/1995 |
| JP | 08 099 080 | A2 | 4/1996 |
| JP | 10 052 616 | A2 | 2/1998 |
| JP | 10076254 | | 3/1998 |
| JP | 10 139 645 | A2 | 5/1998 |
| JP | 2000281445 | | 10/2000 |
| RU | 2 034 789 | | 5/1995 |
| RU | 2 064 429 | | 7/1996 |
| RU | 2 070 438 | | 12/1996 |
| SU | 1717538 | | 3/1992 |
| WO | WO 88/07500 | | 10/1988 |
| WO | WO 91/01786 | | 2/1991 |
| WO | WO 93/12864 | | 1/1992 |
| WO | WO 92/12784 | | 8/1992 |
| WO | WO 93/17725 | | 9/1993 |
| WO | WO 93/23336 | | 11/1993 |
| WO | WO 94/10091 | | 3/1994 |
| WO | WO 94/23827 | | 10/1994 |
| WO | WO 95/05237 | | 2/1995 |
| WO | WO 95/09129 | | 4/1995 |
| WO | WO 95/24256 | | 9/1995 |
| WO | WO 96/30309 | | 10/1996 |
| WO | WO 96/30310 | | 10/1996 |
| WO | WO 97/30938 | | 8/1997 |
| WO | WO 97/34832 | | 9/1997 |
| WO | WO 97/38941 | A1 | 10/1997 |
| WO | WO 98/12489 | | 3/1998 |
| WO | WO 98/43796 | | 10/1998 |
| WO | WO 99/07456 | | 2/1999 |
| WO | WO 99/10069 | | 3/1999 |
| WO | WO 99/10076 | | 3/1999 |
| WO | WO 99/47226 | | 9/1999 |
| WO | WO 00/00266 | | 1/2000 |
| WO | WO 00/00437 | | 1/2000 |
| WO | WO 00/01624 | | 1/2000 |
| WO | WO 00/01625 | | 1/2000 |
| WO | WO 00/01626 | | 1/2000 |
| WO | WO 00/25887 | | 5/2000 |
| WO | WO 00/35559 | A2 | 6/2000 |
| WO | WO 00/37363 | | 6/2000 |
| WO | WO 00/37385 | A1 | 6/2000 |
| WO | WO 00/43319 | | 7/2000 |
| WO | WO 01/12559 | A1 | 2/2001 |
| WO | WO 01/44120 | A2 | 6/2001 |
| WO | WO 01/ 74725 | | 10/2001 |
| WO | WO 02/14228 | A2 | 2/2002 |
| WO | WO 02/085794 | | 10/2002 |
| WO | WO 02/100509 | | 12/2002 |
| WO | 03/022745 | | 3/2003 |
| WO | WO 2004/076361 | A1 | 9/2004 |
| WO | 2006/008324 | | 1/2006 |

OTHER PUBLICATIONS

Dimitris Ioannis Collias, Declaration under 37 CFR §1.132, Apr. 1, 2004.

Newcombe, G., et al., "Granular activated Carbon: importance of surface properties in the adsorption of naturally occurring organics", *Colloids and Surfaces A: Physiochemical and Engineering Aspects,* 1993, 65-71, vol. 78.

Gregg, S.J., et al., "Mesoporous solids: the Type IV isotherm", *Adsorption, Surface Area and Porosity,* 1982, 137-143, 2nd Edition, Academic Press, Inc.

Report of Task Force, "Guide Standard and Protocol for Testing Microbiological Water Purifiers", *United States Environmental Protection Agency,* (submitted Apr. 1986), revised Apr. 1987, 1-39.

Westvaco Products On-Line, "Wood-based Activated Carbons", (2 pgs), downloaded Jul. 2001.

Abotsi, Godried, "Interfacial Properties of Coal: A Guide to Catalyst Loading and Dispersion for Coal Conversion", *Energia,* vol. 7, No. 5, 3-5, (1996).

Moreno-Castilla, C., et al., "The Creation of Acid Carbon Surfaces by Treatment with $(NH_4)_2S_2O_8$", *Carbon,* vol. 35, No. 10-11, 1619-1626 (1997).

Franz, M., et al., "Effect of Chemical Surface Heterogeneity on the Adsorption Mechanism of Dissolved Aromatics on Activated Carbon", *Carbon,* vol. 28, No. 13, 1807-1819, (2000).

Babic, B.M., et al., "Point of Zero Charge and Intrinsic Equilibrium Constants of Activated Carbon Cloth", *Carbon,* vol. 37, No. 3, 477-481, (Feb. 22, 1999).

Menendez, J.A., et al., "On the Difference Between the Isoelectric Point and the Point of Zero Charge of Carbons", *Carbon,* vol. 33, No. 11, 1655-1657, (1995).

http://www.waterfilters.net/KX-Matrikx-20-185-125-083-cermikx-SC-Water-Filter_p_12..."KX Matrikx Ceramikx SC 20-185-125-083 Water Filter", Mar. 11, 2008.

Barrett, Joyner, and Halenda (BJH) Process, "The Determination of Pore Volume and Area Distributions in Porous Substances I. Computations from Nitrogen Isotherns," J. Amer. Chem. Soc., vol. 73, pp. 373-380 (1951).

Bautista—Toledo, I. et al., "Activated carbons as Adsorbents of Bacteria," Conference Proceedings for Eurocarbon 98, Strasbourg, France Jul. 5-9, 1998.

Burchell, T.D., et al., "The effect of Neutron Irradiation on the Structure and Properties of Carbon-Carbon Composite Materials," Effects of Ratioation on Materials: 16$^{th}$ International Symposium, ASTM STP 1175, American Society for Testing and Materials, Philadelphia, 1993.

Ceramikx:All—Carbon, Sub-Micron Performance; http://www.kxindustries.com; pp. 1-2, 2005, KX Industries, L.P.

Cuno, Process Filtration Products, Product Information, Zeta Plus VIROSORB® 1MDS, pp. 2 (1989).

Daniels, S. S., "The Adsorption of Microorganisms onto Solid Surfaces: A Review," Developments in Industrial Microbiology, pp. 211-243, Aug. 29-Sep. 4, 1971.

Derbyshire< F., et al., "Carbon Fiber Composite Molecular Sieves for Gas Separation," Eighth CIMTEC, Florence, Italy, Jun. 28-Jul. 2, 1994.

Dorfner, K., "2.1—Synthetic Resin Ion Exchangers," Ion Exchangers Properties and Applications, Cover page and pp. 16-35 (1972).

Evans, M. J. B., et al., "The Production of Chemically-Activated Carbon," Carbon, vol. 37, pp. 269-274 (1999).

Gerba, C.P., "Applied and Theortetical Aspects of Virus Adsorption to Surfaces," Advances in Applied Microbiology, vol. 30, pp. 133-168 (Copyright © 1984).

Gerba, C.P., et al., "Removal of Poliovirus and Rotavirus from Tapwater by a Quaternary Ammonium Resin," Water Res., vol. 18, No. 1, pp. 17-19 (1984).

Goyal, S. M., et al., "Concentration of Bacteriophage Lysates by Filter Chromatography," Journal of Virological Methods, vol. 1, pp. 79-85 (1980).

Goyal, S.M., "Simple Method for Concentration of Bacteria from Large Volumes of Tap Water," Applied and Environmental Microbiology, vol. 40, No. 5, pp. 912-916 (Nov. 1980).

Hercules Product Data, Polycup® Resins and Kymene® 2064, Hercules Incorporated, Wilmington, DE 10 pages (date unkown).

Hercules Product Information, Hercules MSDS—Kymene 450 wet strength resin, 20 pages (Jan. 29, 1998).

Hill, Jr., W.F., et al., "Detection of Viruses in Water: Sensitivity of the Tentative Standard Method for Drinking Water," Applied and Environmental Microbiology, vol. 31, No. 2, pp. 254-261 (Feb. 1976).

Hou, K. et al., "Capture of Latex Beads, Bacteria, Endotoxin, and Viruses by Charge Modified Filters," Applied and Environmental Microbiology, vol. 40, No. 5, pp. 892-896 (Nov. 1980).

Hurst, C. J., et al., "Differential Effects of Tretrazolium Dyes upon Bacteriophage Plaque Assay Titers," Applied and Environmental Microbiologoy, vol. 60, No. 9, pp. 3462-3465 (Sep. 1994).

Isbister, J.D., et al., "Increasing ARCAT® Test Sensitivity for Examination of Potable Waters," Project Summary, United States Environmental Protection Agency, Research and Development 3 pgs. (May 1982).

Jagtoyen, M. et al., "Novel Activated Carbon Materials for Water Treatment," The European Carbon Conference "Carbon 96", Newcastle, UK Jul. 1996.
Jagtoyen, M. et al., "Activated carbons from yellow poplar and white oak by $H_3PO_4$ activation," Carbon, vol. 36, No. 7-8, pp. 1085-1097 (1998).
Jasra, R.V., et al., "Separation of Gases by Pressure Swing Adsorption," Separation Science and Technologoy, vol. 26, No. 7, pp. 885-930 (1991).
Kaneko, K., et al., "Microporosity and Adsorption Characteristics Against NO, $SO_2$ and $NH_3$ of Pitch Based Activated Carbon Fibers," Carbon, vol. 26, No. 3, pp. 327-332 (1988).
Kimber, G.M., et al., "Fabrication of Carbon Fibre Composites for Gas Separation," Gas. Sep. Purif., vol. 10, No. 2, pp. 131-136 (1996).
KXIndustries, L. P. Technical Data: CERAMIKX; http://www.kxindustries.com/matrikx/ceramiks.htm; pp. 1-3, 2002: KX Industries L.P.
LeChevallier, M.W., et al., "Disinfection of Bacteria Attached to Granular Activated Carbon," Applied and Environmental Microbiology, vol. 48, No. 5, pp. 918-923 (1984).
Ma, J., et al., "Evaluation of MK Filters for Recovery of Enteroviruses from Tap Water," Applied and Environmental Microbiology, vol. 60, No. 6, pp. 1974-1977 (Jun. 1994).
Moore, R.S., et al., "Improved Methods for Poliovirus Recovery from Water with Electropositive Adsorbent Filters," Annu. Meet. Am. Soc. Microbiol., paper Q55, 14 pages (1982).
Nupen, E.M., et al., "The Recovery of Viruses from Drinking—Water by Means of an In-Line Electropositive Cartridge Filter," National Institute for Water Research, Council for Scientific and Industrial Research, pp. 1-7 (date unknown).
Openko, N., et al., "Application of Carbon Materials in Water Purification," Conference Proceedings for Eurocarbon '98, Strasbourg, France Jul. 5-9, 1998.
Powell, T., et al., "Investigating the Effect of Carbon Shape on Virusa Adsorption," Environmental Science and Technology, vol. 34, No. 11, pp. 2779-2783 (2000).
Powell, T.M., et al., "Comparative Adsorption of a Model Bacteriophage by Activated Carbon," University of Kentucky Dept. of Civil Engineering and Center for Applied Energy Research, pp. 685-690.
Preston, D.R., et al., "Removal of Viruses from Tapwater by Fiberglass Filters Modified with a Combination of Cationic Polymers," Wat. Sci. Tech.,. vol. 21, No. 3, pp. 93-98 (1989).
Ryoo, R., et al., "Synthesis of Highly Ordered Carbon Molecular Sieves via Template—Mediated Structural Transformation," The Journal ofo Physical Chemistry B, vol. 103, Nu. 37, pp. 7743-7746 (1999).
Ryu, S.K., "Porosity of Activated Carbon Fibre," High Temperatures—High Pressures, vol. 22, pp. 345-354 (1990.
Sakoda, A., et al., "Adsorption of Viruses in Water Environment onto Solid Surfaces," Wat. Sci. Tech., vol. 35, No. 7, pp. 107-114 (1997).
Sobsey, M.D., et al., "Improved Electopositive Filters for Concentrating Viruses from Large Volumes of Water," Presents at the International Symposium on Viruses and Wastewater Treatment, pp. 107 (Sep. 15-17, 1980).
Sobsey, M.D., et al., "Concentration of Poliovirus from Tap Water Using Positively Charged Microporous Filgers," Applied and Environmental Microbiology, vol. 37, No. 3, pp. 588-595 (Mar. 1979).
Sobsey, M.D., et al., "Evaluating Adsorbent Filter Performance for Enteric Virus Concentrations in Tap Water," Research and Technology, pp. 542-548 (Oct. 1981).
United States Environmental Protection Agency, Office of Research and Development, "Stormwater Treaatment at Critical Areas: Evaluation of Filtration Methods," EPA/600/R-00/010, pp. 14, Oct. 1999.
Vaughn, J.M., et al., "Chapter 10: Virus Inactivation by Disinfectants," IV Disinfecction, pp. 217-241 (date unknown).
Wei, G.C., et al., "Carbon-Bonded Carbon Fiber Insulation for Radioisotope Space Power Systems," Ceramic Bulletin, vol. 64, No. 5, pp. 691-699 (1985).
Westvaco Products On-Line, "Wood-based Activated Carbons", (2 pgs.), downloaded Jul. 2001.
World Health Organization—Geneva, 1996 "Chapter 2—Microbiolgical Aspects: Introducction," Guidelines for drinking—water quality, Second edition, vol. 2, Health Criteria and other supporting information, cover page and pp. 9-12.
Zerda, K.S., et al., "Adsorption of Viruses to Charge—Modified Silica," Applied and Environmental Microbiolgoy, vol. 49, No. 1, pp. 91-95 (Jan. 1985).

WATER FILTER MATERIALS AND WATER FILTERS CONTAINING A MIXTURE OF MICROPOROUS AND MESOPOROUS CARBON PARTICLES

CROSS REFERENCE TO RELATED APPLICATION

Pursuant to 35 U.S.C. §120, this application is a continuation of, and claims the benefit of the filing date of U.S. application Ser. No. 12/501,216 filed Jul. 10, 2009, issued as U.S. Pat. No. 7,922,008, which is a divisional of U.S. application Ser. No. 12/211,200 filed Sep. 16, 2008, issued as U.S. Pat. No. 7,712,613, which is a divisional of U.S. application Ser. No. 11/119,120, filed Apr. 29, 2005 now abandoned, which is a continuation of U.S. application Ser. No. 11/101,130, filed on Apr. 7, 2005, now abandoned, and is a continuation-in-part of U.S. application Ser. No. 10/705,572, issued as U.S. Pat. No. 7,614,508, and Ser. No. 10/705,174, issued as U.S. Pat. No. 7,614,507, both of which were filed on Nov. 11, 2003 which are continuations-in-part of U.S. application Ser. No. 10/464,209, now abandoned, and Ser. No. 10/464,210, issued as U.S. Pat. No. 7,614,506, both of which were filed on Jun. 18, 2003 which are continuations-in-part of U.S. application Ser. No. 09/935,962, now abandoned, and Ser. No. 09/935,810, now abandoned, both of which were filed on Aug. 23, 2001, the substances of which are incorporated herein by reference. Additionally, pursuant to 35 U.S.C. §120, this application is a continuation-in-part of International Application No. PCT/US03/05416 designating the U.S., filed Feb. 21, 2003, and is also a continuation-in-part of International Application No. PCT/US03/05409 designating the U.S., filed Feb. 21, 2003, the substances of which are incorporated herein by reference.

FIELD OF THE INVENTION

The present invention relates to the field of water filter materials and water filters and processes for using the same, and, more particularly, to the field of water filters containing microporous and mesoporous activated carbon particles.

BACKGROUND OF THE INVENTION

Water may contain many different kinds of contaminants including, for example, particulates, harmful chemicals, and microbiological organisms, such as bacteria, parasites, protozoa and viruses. In a variety of circumstances, these contaminants must be removed before the water can be used. For example, in many medical applications and in the manufacture of certain electronic components, extremely pure water is required. As a more common example, harmful contaminants in water must be removed, reduced to a harmless level, or deactivated (which is sometimes referred to as "killing"), before the water is potable, i.e., fit to consume. Despite modern water purification means, the general population is at risk, and in particular infants and persons with compromised immune systems are at considerable risk.

In the U.S. and other developed countries, municipally treated water typically includes one or more of the following impurities: suspended solids, bacteria, parasites, viruses, organic matter, heavy metals, and chlorine. Breakdown and other problems with water treatment systems sometimes lead to incomplete removal of bacteria and viruses. In other countries, there are deadly consequences associated with exposure to contaminated water, as some of them have increasing population densities, increasingly scarce water resources, and no water treatment utilities. It is common for sources of drinking water to be in close proximity to human and animal waste, such that microbiological contamination is a major health concern. As a result of waterborne microbiological contamination, an estimated six million people die each year, half of which are children under 5 years of age.

Another source of contamination of drinking water supplies is chemical contaminants, such as chlorine, taste, odor, lead, arsenic, volatile organic compounds (VOC), trihalomethanes (THM), chromium, etc. As an example, trihalomethanes (THM), which are by-products that can occur when residual chlorine from water treatment processes reacts with organic materials in the water, are found in many water sources around the world. These materials can occur naturally, and can be unintentionally formed in water supplies when organic compounds, for example industrial waste, leaches into water bodies that are subsequently treated with chlorine. In the water treatment and filtration industries, THM represent a wide class of compounds, and are typically called "total trihalomethanes" (TTHM). TTHM can be carcinogenic and may cause more immediate health issues such as rashes and other skin irritations. Moreover, TTHM can, and often do, have a profoundly negative effect on the taste of drinking water. Thus, the removal of TTHM from water is highly desirable.

Methods and filters for removing TTHM and other organic compounds from water are known. But the methods and filters are different than, and often inconsistent with the removal of small particles such as bacteria and viruses. As such, consumers of water are often required to have two or more filters, or one multi stage filter, to meet all of their filtration requirements. Multi-stage filters and multiple filters often require more space, and more expense than a single filter.

Hence, there exists a need for single stage filters that can remove different contaminants that have variant properties. That is, a filter that can be produced from a unitary material, albeit a material that may be a mixture of different components, in a one step process, resulting in a single stage filter having multiple removal capacity. More specifically, there is a need for a single stage filter that can simultaneously remove small particles, such as viruses and bacteria, as well as organic compounds, such as TTHM. This and other benefits are provided by the present invention.

SUMMARY OF THE INVENTION

A filter for providing or treating potable water is provided. The filter includes a housing having an inlet and an outlet, and a filter material disposed within the housing. The filter material is formed from about 25% to about 75%, by weight, of a plurality of microporous activated carbon particles and from about 25% to about 75%, by weight, of a plurality of mesoporous activated carbon filter particles. In one aspect of the present invention, the microporous activated carbon filter particles, the mesoporous activated carbon filter particles, or both are coated at least partially or entirely with a cationic polymer. And in another aspect of the present invention, at least a portion of the microporous activated carbon filter particles, the mesoporous activated carbon filter particles, or both are coated with silver or a silver containing material.

Other materials may be added to the filter materials of the present invention, such as, activated carbon powders, activated carbon granules, activated carbon fibers, carbon nanotubes, activated carbon nanotubes, single-wall carbon nanotubes (SWNT), multi-wall carbon nanotubes (MWNT), zeolites, activated alumina, magnesia, activated magnesia, diatomaceous earth, activated silica, hydrotalcites, metal-organic framework materials (MOF), glass particles or fibers, synthetic polymer nanofibers, natural polymer nanofibers, polyethylene fibers, polypropylene fibers, ethylene maleic anhydride copolymer fibers, sand, clay and mixtures thereof. These other materials, like the activated carbon particles discussed directly above, can be coated at least partially or entirely with a cationic polymer, silver, a silver containing material, and mixtures thereof.

In another aspect of the present invention there is provided a kit comprising a filter for providing potable water. The filter comprises a housing having an inlet and an outlet, and a filter material disposed within the housing formed at least in part from a plurality of microporous and mesoporous activated carbon filter particles wherein at least a portion of these particles are coated with a cationic material. The kit further comprises a package for containing the filter and either the package or the filter housing comprises information that the filter or filter material: reduces bacteria; reduces viruses; reduces microorganisms; reduces TTHM, reduces chemicals or any combination of these.

BRIEF DESCRIPTION OF THE DRAWING

While the specification concludes with claims particularly pointing out and distinctly claiming the invention, it is believed that the present invention will be better understood from the following description taken in conjunction with the accompanying drawing in which:

DETAILED DESCRIPTION OF THE PREFERRED EMBODIMENTS

Figure 1:
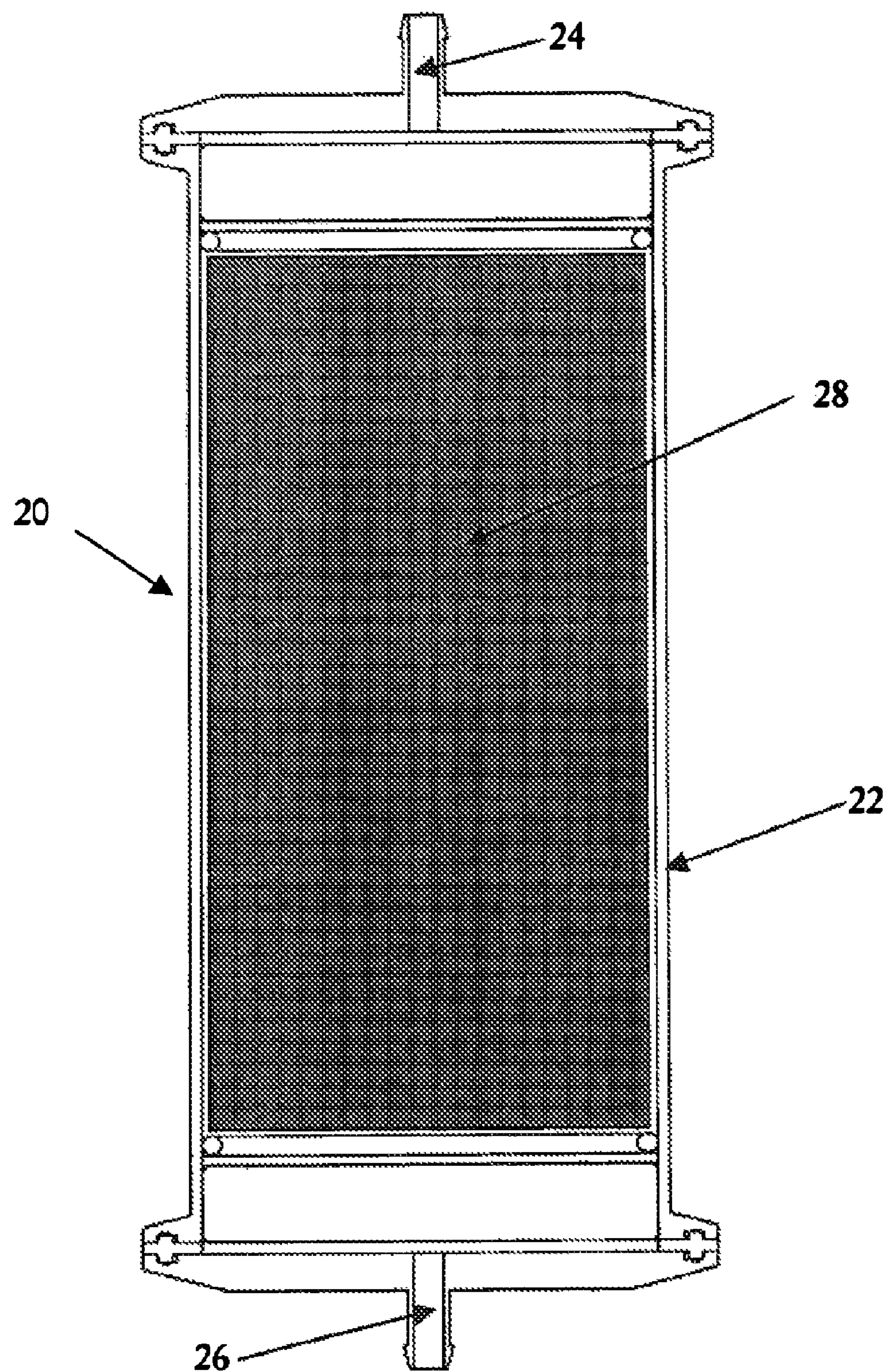
FIG. 1 is a cross sectional side view of a radial flow filter made in accordance with the present invention.

All documents cited are, in relevant part, incorporated herein by reference. The citation of any document is not to be construed as an admission that it is prior art with respect to the present invention.

I. Definitions

As used herein, the terms “filters” and “filtration” refer to structures and mechanisms, respectively, associated with microorganism removal (and/or other contaminant removal), via primarily adsorption and/or size exclusion to a lesser extent.

As used herein, the terms “removal”, “reduce”, “reduction”, and their derivatives refer to partial reduction of the number or concentration of contaminants.

As used herein, the phrase “filter material” is intended to refer to an aggregate of filter particles. The aggregate of the filter particles forming a filter material can be either homogeneous or heterogeneous. The filter particles can be uniformly or non-uniformly distributed (e.g., layers of different filter particles) within the filter material. The filter particles forming a filter material also need not be identical in shape or size and may be provided in either a loose or interconnected form. For example, a filter material might comprise microporous, and mesoporous and basic activated carbon particles in combination with activated carbon fibers, and these filter particles may be either provided in loose association or partially or wholly bonded by a polymeric binder or other means to form an integral structure.

As used herein, the phrase “filter particle” is intended to refer to an individual member or piece, which is used to form at least part of a filter material. For example, a fiber, a granule, a bead, etc. are each considered filter particles herein. Further, the filter particles can vary in size, from impalpable filter particles (e.g., a very fine powder) to palpable filter particles.

As used herein, the phrase “filter material pore volume” refers to the total volume of the inter-particle pores in the filter material with sizes larger than 0.1 μm.

As used herein, the phrase “filter material total volume” refers to the sum of the inter-particle pore volume and the volume occupied by the filter particles.

As used herein, the terms “microorganism”, “microbial organism”, “microbiological organism” and “pathogen” are used interchangeably. These terms refer to various types of microorganisms that can be characterized as bacteria, viruses, parasites, protozoa, and germs.

As used herein, the phrase “Bacteria Removal Index” (BRI) of filter particles is defined as:

BRI=100×[1−(bath concentration of *E. coli* bacteria at equilibrium/control concentration of *E. coli* bacteria)], wherein “bath concentration of *E. coli* bacteria at equilibrium” refers to the concentration of bacteria at equilibrium in a bath that contains a mass of filter particles having a total external surface area of 1400 $cm^2$ and Sauter mean diameter less than 55 μm, as discussed more fully hereafter. Equilibrium is reached when the *E. coli* concentration, as measured at two time points 2 hours apart, remains unchanged to within half order of magnitude. The phrase “control concentration of *E. coli* bacteria” refers to the concentration of *E. coli* bacteria in the control bath, and is equal to about $3.7\times10^9$ CFU/L. The Sauter mean diameter is the diameter of a particle whose surface-to-volume ratio is equal to that of the entire particle distribution. Note that the term “CFU/L” denotes “colony-forming units per liter”, which is a typical term used in *E. coli* counting. The BRI is measured without application of chemical agents that provide bactericidal effects. An equivalent way to report the removal capability of filter particles is with the “Bacteria Log Removal Index” (BLRI), which is defined as:

BLRI=−log[1−(BRI/100)].

The BLRI has units of “log” (where “log” stands for logarithm). For example, filter particles that have a BRI equal to 99.99% have a BLRI equal to 4 log. Test procedures used to determine these values can be found in International Application No. PCT/US03/05416, Feb. 21, 2003, and also in International Application No. PCT/US03/05409, filed Feb. 21, 2003, the substances of which are incorporated herein by reference.

As used herein, the phrase “Viruses Removal Index” (VRI) for filter particles is defined as:

VRI=100×[1−(bath concentration of *MS*-2 phages at equilibrium/control concentration of *MS*-2 phages)], wherein “bath concentration of MS-2 phages at equilibrium” refers to the concentration of phages at equilibrium in a bath that contains a mass of filter particles having a total external surface area of 1400 $cm^2$ and Sauter mean diameter less than 55 μm, as discussed more fully hereafter. Equilibrium is reached when the MS-2 concentration, as measured at two time points 2 hours apart, remains unchanged to within half order of magnitude. The phrase “control concentration of MS-2 phages” refers to the concentration of MS-2 phages in the control bath, and is equal to about $6.7\times10^7$ PFU/L. Note that the term “PFU/L” denotes “plaque-forming units per liter”, which is a typical term used in MS-2 counting. The VRI is measured without application of chemical agents that provide virucidal effects. An equivalent way to report the removal capability of filter particles is with the "Viruses Log Removal Index" (VLRI), which is defined as:

VLRI=−log[1−(VRI/100)].

The VLRI has units of "log" (where "log" is the logarithm). For example, filter particles that have a VRI equal to 99.9% have a VLRI equal to 3 log. Test procedures used to determine these values can be found in International Application No. PCT/US03/05416, Feb. 21, 2003, and also in International Application No. PCT/US03/05409, filed Feb. 21, 2003, the substances of which are incorporated herein by reference.

As used herein, the phrase "Filter Bacteria Log Removal (F-BLR)" refers to the bacteria removal capability of the filter after the flow of the first 2,000 filter material pore volumes. The F-BLR is defined and calculated as:

F-BLR=−log[(effluent concentration of *E. coli*)/(influent concentration of *E. coli*)], where the "influent concentration of *E. coli*" is set to about $1\times10^8$ CFU/L continuously throughout the test and the "effluent concentration of *E. coli*" is measured after about 2,000 filter material pore volumes flow through the filter. F-BLR has units of "log" (where "log" is the logarithm). Note that if the effluent concentration is below the limit of detection of the technique used to assay, then the effluent concentration for the calculation of the F-BLR is considered to be the limit of detection. Also, note that the F-BLR is measured without application of chemical agents that provide bactericidal effects. Test procedures used to determine these values can be found in International Application No. PCT/US03/05416, Feb. 21, 2003, and also in International Application No. PCT/US03/05409, filed Feb. 21, 2003, the substances of which are incorporated herein by reference.

As used herein, the phrase "Filter Viruses Log Removal (F-VLR)" refers to the viruses removal capability of the filter after the flow of the first 2,000 filter material pore volumes. The F-VLR is defined and calculated as:

F-VLR=−log[(effluent concentration of *MS*-2)/(influent concentration of MS-2)], where the "influent concentration of MS-2" is set to about $1\times10^7$ PFU/L continuously throughout the test and the "effluent concentration of MS-2" is measured after about 2,000 filter material pore volumes flow through the filter. F-VLR has units of "log" (where "log" is the logarithm). Note that if the effluent concentration is below the limit of detection of the technique used to assay, then the effluent concentration for the calculation of the F-VLR is considered to be the limit of detection. Also, note that the F-VLR is measured without application of chemical agents that provide virucidal effects. A test procedure used to determine this value can be found in International Application No. PCT/US03/05416, Feb. 21, 2003, and also in International Application No. PCT/US03/05409, filed Feb. 21, 2003, the substances of which are incorporated herein by reference.

As used herein, the phrase "total external surface area" is intended to refer to the total geometric external surface area of one or more of the filter particles, as discussed more fully hereafter.

As used herein, the phrase "specific external surface area" is intended to refer to the total external surface area per unit mass of the filter particles, as discussed more fully hereafter.

As used herein, the term "micropore" is intended to refer to an intra-particle pore having a width or diameter less than 2 nm (or equivalently, 20 Å).

As used herein, the term "mesopore" is intended to refer to an intra-particle pore having a width or diameter between 2 nm and 50 nm (or equivalently, between 20 Å and 500 Å).

As used herein, the term "macropore" is intended to refer to an intra-particle pore having a width or diameter greater than 50 nm (or equivalently, 500 Å).

As used herein, the phrase "total pore volume" and its derivatives are intended to refer to the volume of all the intra-particle pores, i.e., micropores, mesopores, and macropores. The total pore volume is calculated as the volume of nitrogen adsorbed at a relative pressure of 0.9814 using the BET process (ASTM D 4820-99 standard), a process well known in the art.

As used herein, the phrase "micropore volume" and its derivatives are intended to refer to the volume of all micropores. The micropore volume is calculated from the volume of nitrogen adsorbed at a relative pressure of 0.15 using the BET process (ASTM D 4820-99 standard), a process well known in the art.

As used herein, the phrase "sum of the mesopore and macropore volumes" and its derivatives are intended to refer to the volume of all mesopores and macropores. The sum of the mesopore and macropore volumes is equal to the difference between the total pore volume and micropore volume, or equivalently, is calculated from the difference between the volumes of nitrogen adsorbed at relative pressures of 0.9814 and 0.15 using the BET process (ASTM D 4820-99 standard), a process well known in the art.

As used herein, the phrase "pore size distribution in the mesopore range" is intended to refer to the distribution of the pore size as calculated by the Barrett, Joyner, and Halenda (BJH) process, a process well known in the art.

As used herein, the term "carbonization" and its derivatives are intended to refer to a process in which the non-carbon atoms in a carbonaceous substance are reduced.

As used herein, the term "activation" and its derivatives are intended to refer to a process in which a carbonized substance is rendered more porous.

As used herein, the term "activated carbon particles" or "activated carbon filter particles" and their derivatives are intended to refer to carbon particles that have been subjected to an activation process.

As used herein, the phrase "point of zero charge" is intended to refer to the pH above which the total surface of the carbon particles is negatively charged. A test procedure used to determine this value can be found in International Application No. PCT/US03/05416, Feb. 21, 2003, and also in International Application No. PCT/US03/05409, filed Feb. 21, 2003, the substances of which are incorporated herein by reference.

As used herein, the term "basic" is intended to refer to filter particles with a point of zero charge greater than 7.

As used herein, the term "acidic" is intended to refer to filter particles with a point of zero charge less than 7.

As used herein, the phrase "mesoporous activated carbon filter particle" refers to an activated carbon filter particle wherein the sum of the mesopore and macropore volumes may be greater than 0.12 mL/g.

As used herein, the phrase "microporous activated carbon filter particle" refers to an activated carbon filter particle wherein the sum of the mesopore and macropore volumes may be less than 0.12 mL/g.

As used herein, the phrase "mesoporous and basic activated carbon filter particle" is intended to refer to an activated carbon filter particle wherein the sum of the mesopore and macropore volumes may be greater than 0.12 mL/g and has a point of zero charge greater than 7.

As used herein, the phrase "mesoporous, basic, and reduced-oxygen activated carbon filter particle" is intended to refer to an activated carbon filter particle wherein the sum of the mesopore and macropore volumes may be greater than 0.12 mL/g, has a point of zero charge greater than 7, and has a bulk oxygen percentage by weight of 1.5% or less.

As used herein, the phrase "mesoporous and acidic activated carbon filter particle" is intended to refer to an activated carbon filter particle wherein the sum of the mesopore and macropore volumes may be greater than 0.12 mL/g and has a point of zero charge less than 7.

As used herein, the phrase "starting material" refers to any precursor containing mesopores and macropores or capable of yielding mesopores and macropores during carbonization and/or activation.

As used herein, the phrase "axial flow" refers to flow through a planar surface and perpendicularly to that surface.

As used herein, the phrase "radial flow" typically refers to flow through essentially cylindrical or essentially conical surfaces and perpendicularly to those surfaces.

As used herein, the phrase "face area" refers to the area of the filter material initially exposed to the influent water. For example, in the case of axial flow filters, the face area is the cross sectional area of the filter material at the entrance of the fluid, and in the case of the radial flow filter, the face area is the outside area of the filter material.

As used herein, the phrase "filter depth" refers to the linear distance that the influent water travels from the entrance to the exit of the filter material. For example, in the case of axial flow filters, the filter depth is the thickness of the filter material, and in the case of the radial flow filter, the filter depth is half of the difference between the outside and inside diameters of the filter material.

As used herein, the phrases "average fluid residence time" and/or "average fluid contact time" refer to the average time that the fluid is in contact with the filter particles inside the filter as it travels through the filter material, and are calculated as the ratio of the filter material pore volume to the fluid flow rate.

As used herein, the phrases "filter porosity" and/or "filter bed porosity" refer to the ratio of the filter material pore volume to the filter material total volume.

As used herein, the phrase "inlet" refers to the means in which a fluid is able to enter the filter or filter material. For example, the inlet can be a structure that is part of the filter, or the filter material face area.

As used herein, an "outlet" refers to the means in which a fluid is able to exit the filter or filter material. For example, the outlet can be a structure that is part of the filter, or the cross sectional area of the filter material at the exit of the fluid.

As used herein, the term "flow properties of particles" and its derivatives refer to the pressure drop that these particles cause when water flows in between them. For example, when comparing two types of particles with the same particle size and distribution, one of them has better flow properties than the other one if its pressure drop is less.

II. Microporous and Mesoporous Activated Carbon Filter Particles

The filter material of the present invention includes a mixture of microporous and mesoporous activated carbon particles. The mesoporous activated carbon material described herein has superior removal capabilities towards small particles, such as bacteria and nano-sized viruses, while the microporous activated carbon particles have superior removal of chemicals, such as total trihalomethanes (TTHM). The mesoporous activated carbon particles also have much better flow properties than the microporous activated carbon particles, and thus the mesoporous activated carbon particles cause less pressure drop than the microporous activated carbon particles of the same size. In one embodiment, the filter material comprises from about 25% to about 75%, by weight, of a plurality of microporous activated carbon particles and from about 25% to about 75%, by weight, of a plurality of mesoporous activated carbon filter particles. As is discussed in greater detail below, the activated carbon filter particles are preferably coated at least partially or entirely with a cationic polymer, and more preferably, the mesoporous activated carbon particles are at least partially coated with a cationic polymer.

The filter particles can be provided in a variety of shapes and sizes. For example, the filter particles can be provided in simple forms such as powder, granules, fibers, and beads. The filter particles can be provided in the shape of a sphere, polyhedron, cylinder, as well as other symmetrical, asymmetrical, and irregular shapes. Further, the filter particles can also be formed into complex forms such as webs, screens, meshes, non-wovens, wovens, and bonded blocks, which may or may not be formed from the simple forms described above.

Like shape, the size of the filter particle can also vary, and the size need not be uniform among filter particles used in any single filter. In fact, it can be desirable to provide filter particles having different sizes in a single filter. Generally, the size of the filter particles may be between about 0.1 μm and about 10 mm, preferably between about 0.2 μm and about 5 mm, more preferably between about 0.4 μm and about 1 mm, and most preferably between about 1 μm and about 500 μm. For spherical and cylindrical particles (e.g., fibers, beads, etc.), the above-described dimensions refer to the diameter of the filter particles. For filter particles having substantially different shapes, the above-described dimensions refer to the largest dimension (e.g. length, width, or height).

Microporous Activated Carbon Particles

In a preferred embodiment of this invention the plurality of microporous activated carbon particles are present in a concentration of from about 30% to about 55%, and more preferably from about 30% to about 50%, by weight. Typical examples of microporous activated carbon are coconut activated carbon, bituminous coal activated carbon, physically activated wood-based activated carbon, physically activated pitch-based activated carbon, etc. The preferred microporous activated carbon particles are coconut activated carbon particles.

Mesoporous Activated Carbon Particles

The microporous carbon particles of the present invention have good removal properties for chemicals such as, TTHM. But the mesoporous activated carbon filter particles adsorb a larger number of microorganisms compared to microporous activated carbon filter particles. Also, unexpectedly it has been found that mesoporous and basic activated carbon filter particles adsorb a larger number of microorganisms compared to that adsorbed by mesoporous and acidic activated carbon filter particles. Furthermore, it has been found unexpectedly that mesoporous, basic, and reduced-oxygen activated carbon filter particles adsorb a larger number of microorganisms compared to that adsorbed by mesoporous and basic activated carbon filter particles without reduced bulk oxygen percentage by weight.

Although not wishing to be bound by any theory, applicants hypothesize that, with regard to porosity, a large number of mesopores and/or macropores provides more convenient adsorption sites (openings or entrances of the mesopores/macropores) for the pathogens, their fimbriae, and surface polymers (e.g. proteins, lipopolysaccharides, oligosaccharides and polysaccharides) that constitute the outer membranes, capsids and envelopes of the pathogens because the typical size of such is similar to that of the entrances of the mesopores and macropores. Also, mesoporosity and macroporosity may correlate with one or more surface properties of the carbon, such as surface roughness.

Also, not wishing to be bound by theory, applicants hypothesize that basic activated carbon surfaces contain the types of functionality that are necessary to attract a larger number of microorganisms compared to those attracted by an acidic carbon surface. This enhanced adsorption onto the basic carbon surfaces might be attributed to the fact that the basic carbon surfaces attract the typically negatively-charged microorganisms and functional groups on their surface. Applicants further hypothesize that basic carbon is capable of producing disinfectants when placed in water by reducing molecular oxygen. Although the final product of the reduction is hydroxide, applicants believe that reactive oxygen intermediates, such as superoxide, hydroperoxide, and/or hydroxyl radicals, are formed and maybe sufficiently long-lived to diffuse from carbon into bulk solution.

Furthermore, applicants believe that carbon becomes more basic as the bulk oxygen percentage by weight is reduced. A low bulk oxygen percentage by weight may lead to improved bacteria/viruses adsorption because there will be: (1) less carboxylic acids and hence a less negative surface to repel bacteria/viruses; and (2) a less hydrated surface so that water is more easily displaced by bacteria/viruses as they attempt to adsorb to the surface (i.e., less of an energy penalty for the bacteria/viruses to displace other species already occupying sites on the surface). This latter reason (i.e., a less hydrated surface) also ties in with the idea that the ideal surface, discussed hereafter, should be somewhat hydrophobic (that is, it should have just enough oxygen substitution on the edge carbon atoms to allow it to wet out, but not so much as to make it excessively hydrophilic).

The mesoporous filter particles may be the product of any precursor that contains mesopores and macropores or generates mesopores and macropores during carbonization and/or activation. For example, and not by way of limitation, the mesoporous filter particles can be wood-based activated carbon particles, coal-based activated carbon particles, peat-based activated carbon particles, pitch-based activated carbon particles, tar-based activated carbon particles, bean-based activated carbon particles, other lignocellulosic-based activated carbon particles, and mixtures thereof.

Activated carbon can display acidic, neutral, or basic properties. The acidic properties are associated with oxygen-containing functionalities or functional groups, such as, and not by way of limitation, phenols, carboxyls, lactones, hydroquinones, anhydrides, and ketones. The basic properties have heretofore been associated with functionalities such as pyrones, chromenes, ethers, carbonyls, as well as the basal plane $\pi$ electrons. The acidity or basicity of the activated carbon particles is determined with the "point of zero charge" technique (Newcombe, G., et al., *Colloids and Surfaces A: Physicochemical and Engineering Aspects,* 78, 65-71 (1993)), the substance of which is incorporated herein by reference. The technique is further described in Section VII hereafter. The mesoporous filter particles of the present invention may have a point of zero charge between 1 and 14, preferably greater than about 4, preferably greater than about 6, preferably greater than about 7, preferably greater than about 8, more preferably greater than about 9, and most preferably between about 9 and about 12.

The point of zero charge of activated carbons inversely correlates with their bulk oxygen percentage by weight. Mesoporous activated carbon particles of the present invention may have a bulk oxygen percentage by weight less than about 5%, preferably less than about 2.5%, preferably less than about 2.3%, preferably less than about 2%, more preferably less than about 1.2%, and most preferably less than about 1%, and/or greater than about 0.1%, preferably greater than about 0.2%, more preferably greater than about 0.25%, and most preferably greater than about 0.3%. Also, the point of zero charge of activated carbon particles correlates with the oxidation-reduction potential (ORP) of the water containing the particles because the point of zero charge is a measure of the ability of the carbon to reduce oxygen (at least for basic carbons). Filter particles of the present invention may have an ORP less than about 570 mV, preferably less than about 465 mV, preferably less than about 400 mV, preferably less than about 360 mV, preferably less than about 325 mV, and most preferably between about 290 mV and about 175 mV.

Particle Activation

The electric resistance of the activated carbon filter particles or filter material is one of their important properties as it relates to their ability to form a filter block. For example, a resistive heating method can be used to form filter blocks, wherein a filter material is heated by passing electricity between 2 ends of the filter material. The electric resistance of the filter material will control its ability to heat in a short time. The electric resistance is measured by forming filter blocks and measuring the electric resistance between the 2 faces of the block by contacting them with 2 electrodes from a voltmeter.

Filter particles may be achieved by way of treating a starting material as described here below. The treatment conditions may include atmosphere composition, pressure, temperature, and/or time. The atmospheres of the present invention may be reducing or inert. Heating the filter particles in the presence of reducing atmospheres, steam, or inert atmospheres yields filter material with reduced surface oxygen functionality. Examples of suitable reducing atmospheres may include hydrogen, nitrogen, dissociated ammonia, carbon monoxide, and/or mixtures. Examples of suitable inert atmospheres may include argon, helium, and/or mixtures thereof.

The treatment temperature, when the activated carbon particles do not contain any noble metal catalysts (e.g., platinum, gold, palladium) may be between about 600° C. and about 1,200° C., preferably between about 700° C. and about 1,100° C., more preferably between about 800° C. and about 1,050° C., and most preferably between about 900° C. and about 1,000° C. If the activated carbon particles contain noble metal catalysts, the treatment temperature may be between about 100° C. and about 800° C., preferably between about 200° C. and about 700° C., more preferably between about 300° C. and about 600° C., and most preferably between about 350° C. and about 550° C.

The treatment time may be between about 2 minutes and about 10 hours, preferably between about 5 minutes and about 8 hours, more preferably between about 10 minutes and about 7 hours, and most preferably between about 20 minutes and about 6 hours. The gas flow rate may be between about 0.25 standard L/h.g (i.e., standard liters per hour and gram of carbon; 0.009 standard $ft^3$/h.g) and about 60 standard L/h.g (2.1 standard $ft^3$/h.g), preferably between about 0.5 standard L/h.g (0.018 standard $ft^3$/h.g) and about 30 standard L/h.g (1.06 standard $ft^3$/h.g), more preferably between about 1.0 standard L/h.g (0.035 standard $ft^3$/h.g) and about 20 standard L/h.g (0.7 standard $ft^3$/h.g), and most preferably between about 5 standard L/h.g (0.18 standard $ft^3$/h.g) and about 10 standard L/h.g (0.35 standard $ft^3$/h.g). The pressure can be maintained greater than, equal to, or less than atmospheric during the treatment time. As will be appreciated, other processes for producing a mesoporous, basic, and reduced-oxygen activated carbon filter material can be employed. Also, such treatment of a starting material as described above may be repeated multiple times, depending on the starting material, in order to obtain a filter material.

A starting material may be commercially obtained, or may be made by the methods which are well known in the art, as described in, for example, Jagtoyen, M., and F. Derbyshire, *Carbon,* 36(7-8), 1085-1097 (1998), and Evans, et al., *Carbon,* 37, 269-274 (1999), and Ryoo et al., *J. Phys. Chem. B,* 103(37), 7743-7746 (1999), the substances of which are herein incorporated by reference. Typical chemicals used for activation/carbonization include phosphoric acid, zinc chloride, ammonium phosphate, etc., which may be used in combination with the methods described in the two immediately cited journals.

Particle Porosity Size and Volume

The Brunauer, Emmett and Teller (BET) specific surface area and the Barrett, Joyner, and Halenda (BJH) pore size distribution can be used to characterize the pore structure of both microporous and mesoporous activated carbon particles. Preferably, the BET specific surface area of the mesoporous and basic activated carbon filter particles may be between about 500 $m^2/g$ and about 3,000 $m^2/g$, preferably between about 600 $m^2/g$ to about 2,800 $m^2/g$, more preferably between about 800 $m^2/g$ and about 2,500 $m^2/g$, and most preferably between about 1,000 $m^2/g$ and about 2,000 $m^2/g$.

The total pore volume of the mesoporous and basic activated carbon particles is measured during the BET nitrogen adsorption and is calculated as the volume of nitrogen adsorbed at a relative pressure, $P/P_0$, of 0.9814. More specifically and as is well known in the art, the total pore volume is calculated by multiplying the "volume of nitrogen adsorbed in mL(STP)/g" at a relative pressure of 0.9814 with the conversion factor 0.00156, that converts the volume of nitrogen at STP (standard temperature and pressure) to liquid. The total pore volume of the mesoporous activated carbon filter particles may be greater than about 0.4 mL/g, or greater than about 0.7 mL/g, or greater than about 1.3 mL/g, or greater than about 2 mL/g, and/or less than about 3 mL/g, or less than about 2.6 mL/g, or less than about 2 mL/g, or less than about 1.5 mL/g.

The sum of the mesopore and macropore volumes is measured during the BET nitrogen adsorption and calculated as the difference between the total pore volume and the volume of nitrogen adsorbed at $P/P_0$ of 0.15. The sum of the mesopore and macropore volumes of the mesoporous activated carbon filter particles may be greater than about 0.12 mL/g, or greater than about 0.2 mL/g, or greater than about 0.4 mL/g, or greater than about 0.6 mL/g, or greater than about 0.75 mL/g, and/or less than about 2.2 mL/g, or less than about 2 mL/g, or less than about 1.5 mL/g, or less than about 1.2 mL/g, or less than about 1 mL/g.

The BJH pore size distribution can be measured using the Barrett, Joyner, and Halenda (BJH) process, which is described in *J. Amer. Chem. Soc.,* 73, 373-80 (1951) and Gregg and Sing, ADSORPTION, SURFACE AREA, AND POROSITY, 2nd edition, Academic Press, New York (1982), the substances of which are incorporated herein by reference. In one embodiment, the pore volume of the mesoporous activated carbon particles may be at least about 0.01 mL/g for any pore diameter between about 4 nm and about 6 nm. In an alternate embodiment, the pore volume of the mesoporous activated carbon particles may be between about 0.01 mL/g and about 0.04 mL/g for any pore diameter between about 4 nm and about 6 nm. In yet another embodiment, the pore volume of the mesoporous activated carbon particles may be at least about 0.03 mL/g for pore diameters between about 4 nm and about 6 nm or is between about 0.03 mL/g and about 0.06 mL/g. In a preferred embodiment, the pore volume of the mesoporous activated carbon particles may be between about 0.015 mL/g and about 0.06 mL/g for pore diameters between about 4 nm and about 6 nm.

The ratio of the sum of the mesopore and macropore volumes to the total pore volume of the mesoporous activated carbon particles may be greater than about 0.3, preferably greater than about 0.4, preferably greater than about 0.6, and most preferably between about 0.7 and about 1.

The total external surface area is calculated by multiplying the specific external surface area by the mass of the filter particles, and is based on the dimensions of the filter particles. For example, the specific external surface area of mono-dispersed (i.e., with uniform diameter) fibers is calculated as the ratio of the area of the fibers (neglecting the 2 cross sectional areas at the ends of the fibers) to the weight of the fibers. Thus, the specific external surface area of the fibers is equal to: $4/D\rho$, where D is the fiber diameter and $\rho$ is the fiber density. For monodispersed spherical particles, similar calculations yield the specific external surface area as equal to: $6/D\rho$, where D is the particle diameter and $\rho$ is the particle density. For poly-dispersed fibers, spherical or irregular particles, the specific external surface area is calculated using the same respective formulae as above after substituting $\overline{D}_{3,2}$ for D, where $\overline{D}_{3,2}$ is the Sauter mean diameter, which is the diameter of a particle whose surface-to-volume ratio is equal to that of the entire particle distribution. A process, well known in the art, to measure the Sauter mean diameter is by laser diffraction, for example using the Malvern equipment (Malvern Instruments Ltd., Malvern, U.K.). The specific external surface area of the filter particles, either microporous or mesoporous, may be between about 10 $cm^2/g$ and about 100,000 $cm^2/g$, preferably between about 50 $cm^2/g$ and about 50,000 $cm^2/g$, more preferably between about 100 $cm^2/g$ and about 10,000 $cm^2/g$, and most preferably between about 500 $cm^2/g$ and about 7,000 $cm^2/g$.

In one preferred embodiment of the present invention, the filter particles comprise mesoporous activated carbon particles that are wood-based activated carbon particles. These particles have a BET specific surface area between about 1,000 $m^2/g$ and about 2,000 $m^2/g$, total pore volume between about 0.8 mL/g and about 2 mL/g, and sum of the mesopore and macropore volumes between about 0.4 mL/g and about 1.5 mL/g.

In another preferred embodiment of the present invention, the filter particles comprise mesoporous and basic activated carbon particles that are wood-based activated carbon particles. These particles have a BET specific surface area between about 1,000 $m^2/g$ and about 2,000 $m^2/g$, total pore volume between about 0.8 mL/g and about 2 mL/g, and sum of the mesopore and macropore volumes between about 0.4 mL/g and about 1.5 mL/g.

Removal Indices

The BRI of the mesoporous, or mesoporous and basic, or mesoporous, basic and reduced-oxygen activated carbon particles, when measured according to the test procedure set forth herein, may be greater than about 99%, preferably greater than about 99.9%, more preferably greater than about 99.99%, and most preferably greater than about 99.999%. Equivalently, the BLRI of the mesoporous, or mesoporous and basic, or mesoporous, basic and reduced-oxygen activated carbon particles may be greater than about 2 log, preferably greater than about 3 log, more preferably greater than about 4 log, and most preferably greater than about 5 log. The VRI of the mesoporous, or mesoporous and basic, or mesoporous, basic and reduced-oxygen activated carbon particles, when measured according to the test procedure set forth herein, may be greater than about 90%, preferably greater than about 95%, more preferably greater than about 99%, and most preferably greater than about 99.9%. Equivalently, the VLRI of the mesoporous, or mesoporous and basic, or mesoporous, basic and reduced-oxygen activated carbon particles may be greater than about 1 log, preferably greater than about 1.3 log, more preferably greater than about 2 log, and most preferably greater than about 3 log.

The F-BLR of filters of the present invention containing mesoporous, or mesoporous and basic, or mesoporous, basic, and reduced-oxygen activated carbon particles, when measured according to the test procedure set forth herein, may be greater than about 2 logs, preferably greater than about 3 logs, more preferably greater than about 4 logs, and most preferably greater than about 6 logs. The F-VLR of filters of the present invention containing mesoporous, or mesoporous and basic, or mesoporous, basic, and reduced-oxygen activated carbon particles , when measured according to the test procedure set forth herein, may be greater than about 1 log, preferably greater than about 2 logs, more preferably greater than about 3 logs, and most preferably greater than about 4 logs.

In yet another preferred embodiment of the present invention, the filter particles comprise mesoporous, basic, and reduced-oxygen activated carbon particles that were initially acidic and rendered basic and reduced-oxygen with treatment in a dissociated ammonia atmosphere. These particles are wood-based activated carbon particles. The treatment temperature is between about 925° C. and about 1,000° C., the ammonia flowrate is between about 1 standard L/h.g and about 20 standard L/h.g, and the treatment time is between about 10 minutes and about 7 hours. These particles have a BET specific surface area between about 800 $m^2$/g and about 2,500 $m^2$/g, total pore volume between about 0.7 mL/g and about 2.5 mL/g, and sum of the mesopore and macropore volumes between about 0.21 mL/g and about 1.7 mL/g. A non-limiting example of an acidic activated carbon that is converted to a basic and reduced-oxygen activated carbon is set forth below.

In even yet another preferred embodiment of the present invention, the filter particles comprise mesoporous, basic, and reduced-oxygen activated carbon particles, that were initially mesoporous and basic, with treatment in an inert (i.e., helium) atmosphere. These particles are wood-based activated carbon particles. The treatment temperature is between about 800° C. and about 1,000° C., the helium flowrate is between about 1 standard L/h.g and about 20 standard L/h.g, and the treatment time is between about 10 minutes and about 7 hours. These particles have a BET specific surface area between about 800 $m^2$/g and about 2,500 $m^2$/g, total pore volume between about 0.7 mL/g and about 2.5 mL/g, and sum of the mesopore and macropore volumes between about 0.21 mL/g and about 1.7 mL/g. A non-limiting example of a basic activated carbon that is converted to a basic and reduced-oxygen activated carbon is set forth below.

The Oxygen Reduction Potion, "ORP" is measured using the platinum redox electrode Model 96-78-00 from Orion Research, Inc. (Beverly, Mass.), and following the ASTM standard D 1498-93. The procedure involves the suspension of about 0.2 g of carbon in about 80 mL of tap water, and reading the electrode reading, in mV, after about 5 min of gentle stirring. As will be appreciated, other instrumentation can be substituted for this test procedure as is known in the art.

III. Silver and Silver Containing Materials

It is known that the presence of metals in active carbon can greatly enhance the efficiency and selectivity of the active carbon when it is employed in filtering applications. Specifically, the presence of silver can improve the microbial removal of carbon-based water filters. And more specifically, the Bacteria Removal Index (BRI) and the Viruses Removal Index (VRI) can both be increased with the incorporation of silver.

Those skilled in the art will appreciate, however, that coating materials and other filter additives beyond the filter particles themselves, add costs to the filter. Moreover, coating materials may elude off of the particles into the drinking water with potentially adverse affects. Thus, while the coating materials and other additives described herein provided certain benefits, it is highly desirable to achieve those same benefits with no additive to the activated carbon particles of the present invention.

Thus, in one preferred aspect, the present invention is directed to a filter for providing potable water. The filter comprises a housing having an inlet and an outlet, and a filter material disposed within said housing formed at least in part from a plurality of activated carbon filter particles and particles selected from the group consisting of microporous or mesoporous activated carbon filter particles coated entirely with silver or a silver containing material, microporous or mesoporous activated carbon filter particles partially coated with silver or a silver containing material, silver particles and mixtures thereof.

More specifically, the filter material of the present invention can comprise, among other things, an ad-mixture of silver with the microporous and mesoporous activated carbon filter particles, microporous or mesoporous activated carbon filter particles coated partially or entirely with silver and/or a silver containing material; microporous or mesoporous activated carbon filter particles coated partially or entirely with silver or a silver containing material; or an ad-mixture of microporous activated carbon particles, mesoporous activated carbon filter particles, microporous or mesoporous activated carbon filter particles coated partially or entirely with silver and/or a silver containing material. Preferably, the weight ratio of the silver or silver-containing material to microporous and mesoporous activated carbon filter particles is from about 1:10,000 to about 1:1, based on the weight of the silver or silver-containing material, respectively, and having a BET surface area of at least 800 $m^2$/g and a bulk density of at least 0.1 g/mL.

Methods for adding silver to a carbon based matrix are known, and any of these methods are suitable to produce the filter material of the present invention. See for example, U.S. Pat. Nos. 4,482,641 and 4,045,553, issued to Wennerberg, on Nov. 13, 1984, and Mitsumori et al., on Aug. 30, 1977, respectively. See also, Dimitry, U.S. Pat. No. 3,886,093, which discloses activated carbons having uniformly distributed active metal sites and a method for making such activated carbons. The method of Dimitry involves mixing an aqueous solution of a lignin salt with an aqueous solution of a transition metal salt to precipitate the transition metal and lignin as a metal lignate. The transition metal must be capable of forming a chemical bond with the lignin and in so doing precipitating the lignin from solution as a metal lignate. Dimitry discloses that the time required to complete the precipitation is less than one hour and that usually 30 minutes is sufficient for this purpose. According to Dimitry, suitably the wet metal lignate precipitate can then be dried in a spray drier. The precipitate is then carbonized at a temperature between 371° C. and 983° C. and finally activated at a temperature between 760° C. and 1065° C. Dimitry states that, although drying the metal lignate precipitate is not critical to form an activated carbon product, drying is necessary to form a high surface area end product. The Dimitry, Mitsumori et al. and Wennerberg patents are incorporated herein in their entirety by reference.

While not intending to limit the present invention, one method of producing a substantially uniform dispersion of a silver or silver-containing material on a porous carbon matrix comprises: forming a uniform co-crystallite of a precursor of the silver or silver-containing material and of a carbon precursor as defined above; forming a uniform powdered mixture of the co-crystallite and organic solids comprising an alkali metal hydroxide; pyrolizing the powdered mixture in an inert atmosphere at a temperature in the range of from about 400° C. to about 980° C. to form the carbon matrix having the silver or silver-containing material substantially uniformly dispersed therein; and separating unreacted inorganic material and inorganic reaction products other than the dispersed silver or silver-containing material from the porous carbon matrix.

Any of a variety of known techniques can be employed to form the co-crystallite in the method of this invention which affords uniform co-crystallization, that is, simultaneous crystallization, of the carbon precursor and the precursor of the silver or silver-containing material and the formation of a substantially uniform co-crystallite thereof. Homogeneity of the co-crystallite mixture is essential to the ultimate formation of a uniform dispersion of the silver or silver-containing material in high surface area active carbon. A preferred technique to form the uniform co-crystallite of the carbon precursor and precursor of the silver or silver-containing material in the method of this invention involves the formation of a stable solution of both such precursors in a suitable solvent and spray drying such solution to dryness. In such technique, solvent removal must be carried out rapidly enough to maximize rapid, simultaneous and homogeneous co-crystallization of both precursors from solution. Spray drying provides the desired rapid evaporation to insure rapid, simultaneous and uniform co-crystallization and formation of a homogeneous co-crystallite of both precursors. In a spray drying system which is suitable for use in carrying out the spray drying step to produce the filter material of this invention, a solution of the carbon precursor and of the precursor of the silver or silver-containing material is introduced into a drying chamber through a nozzle. A hot inert gas such as nitrogen is introduced into the drying chamber through a line which surrounds the nozzle and serves to assist in atomizing the solution entering the drying chamber through the nozzle, to accelerate and raise the temperature of the atomized solution droplets and thereby to promote substantially instantaneous evaporation of solvent therefrom to afford a homogeneous co-crystallite powder. Air is introduced into the drying chamber to sweep the co-crystallite powder and nitrogen downward in the drying chamber where the bulk of the co-crystallite powder falls to the bottom of the drying chamber, where it collects and from which it is later removed for use in the subsequent steps of the method of this invention. Gas passes from the drying chamber and then to a cyclone system where co-crystallite powder entrained in the gas stream is separated from the gas and passes downward through a line for collection. The weight ratio of the dispersed metal or metal-containing material to the active carbon matrix in the composition of this invention is preferably from 1:10,000 to 1:1, based on the weight of the metal or metal-containing material, respectively.

IV. Cationic Coating Materials

Carbon typically has an isoelectric point below 6 because there is an excess of acidic functional groups on its surface. Therefore, carbon will often have a negative surface charge at a pH above 6 and hence will be anionic at the pH of drinking water, which typically falls between 6 and 9. In some instances it is desirable for carbon to have a positive surface charge. It has been found that the surface charge of carbon can be inverted by adsorbing certain cationic polymers to its surface. More specifically, it is desirable to coat at least a portion of the microporous or mesoporous activated carbon filter particles of the present filter material with one or more of the cationic polymers listed below. It is even more desirable to coat at least a portion of the microporous or mesoporous activated carbon filter particles of the present filter material with one or more of the cationic polymers listed below and silver or a silver containing material.

Those skilled in the art will appreciate, however, that coating materials and other filter additives beyond the filter particles themselves, add costs to the filter. Moreover, coating materials may elude off of the particles into the drinking water with potentially adverse affects. Thus, while the coating materials and other additives described herein provided certain benefits, it is highly desirable to achieve those same benefits with no additive to the activated carbon particles of the present invention.

The polymers of use must contain amine or quaternary nitrogens, or a mixture of both, and can be prepared by chain growth or step growth polymerization procedures with the corresponding monomers. These monomers can also, if desired, be copolymerized with other monomers. The polymer can also be a synthesized or naturally occurring biopolymer. If any of these polymers, irrespective of source, do not contain amine or quaternary nitrogens, these functional groups can be added by the appropriate graft chemistry. When the polymer lacks quaternary nitrogen, but contains amine nitrogens, the amine functional group must be sufficiently basic to be protonated in water and render the polymer sufficiently cationic to overcome any anionic charge introduced by the carbon. If the nitrogens are not sufficiently basic, the polymers containing amine nitrogens can be quaternized by reaction with methylchloride, dimethylsulfate or other common alkylating agents. As used herein, "cationic coating material" means the cationic polymer used to coat the filter particles.

Examples of cationic polymers suitable for use in the present invention, which are prepared by chain growth polymerization include, but are not limited to: polyvinylamine, poly(N-methylvinylamine), polyallylamine, polyallyldimethylamine, polydiallylmethylamine, polydiallyldimethylammonium chloride, polyvinylpyridinium chloride, poly(2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), and polyvinyl(acrylamide-co-dimethylaminoethylmethacrylate).

Examples of cationic polymers suitable for use in the present invention, which are prepared by step growth polymerization include, but are not limited to: polyethyleneimine, polylysine, poly(propylene)imine dendrimer (DAB-Am) and Poly(amido amine) (PAMAM) dendrimers (or hyperbranched polymers containing the amine or quaternary nitrogen functional group), polyaminoamides, polyhexamethylenebiguandide, polydimethylamine-epichlorohydrine, and any of a number of polyaminosiloxanes, which can be built from monomers such as aminopropyltriethoxysilane, N-(2-aminoethyl)-3-aminopropyltrimethoxysilane, N-trimethoxysilylpropyl-N,N,N-trimethylammonium chloride, and bis(trimethoxysilylpropyl)amine.

Examples of cationic polymers suitable for use in the present invention, which are biopolymers include chitosan, and starch, where the latter is grafted with reagents such as diethylaminoethylchloride.

Examples of cationic polymers suitable for use in the present invention, which contain amine nitrogen but are made more basic by quaternization include the alkylation of polyethyleneimine by methylchloride, and the alkylation of polyaminoamides with epichlorohydrine.

Other categories of cationic polymers suitable for use in the present invention, are coagulants and flocculants in general. Also, cationic polyacrylamide with cationic monomers dimethyl aminoethyl acrylate methyl chloride (AETAC), dimethyl aminoethyl methacrylate methyl chloride (METAC), acrylamidopropyl trimethyl ammonium chloride (APTAC), methacryl amidopropyl trimethyl ammonium chloride (MAPTAC), and diallyl dimethyl ammonium chloride (DADMAC). Finally, ionenes, and silanes are also acceptable for use herein.

Preferred cationic polymers for use in the present invention include polyaminoamides, polyethyleneimine, polyvinylamine, polydiallyldimethylammonium chloride, polydimethylamine-epichlorohydrin, polyhexamethylenebiguanide, poly-[2-(2-ethoxy)-ethoxyethlyl-guanidinium]chloride.

The cationic polymers of the invention can be attached to the surface of carbon by physisorption or chemical crosslinking. Physisorption can be accomplished by spraying a solution of the polymer onto the surface of carbon, or by adding the solution of the polymer to a suspension of the carbon in water. This method of application is applicable to all polymers of the invention. Chemical crosslinking is generally only applicable to those polymers capable of undergoing a crosslinking reaction. This would exclude, for example, the homopolymer of diallydimethylammonium chloride, and any other polymer that lacked a reactive functional group. If the reactive polymer was thermosetting (e.g. the polyaminoamide grafted with epichlorohydrin), it could simply be added to the surface of carbon by one of the two methods already mentioned and heated. If the reactive polymer was not thermosetting, then a suitable crosslinking molecule needs to be introduced into the polymer solution before application to the carbon surface. In the polymers of the present invention (which all contain reactive nucleophilic functional groups), the crosslinking molecules must be electrophilic and can include citric acid, ethyleneglycol diglycidyl ether, 3-glycidoxypropyltriethoxysilane, and the like. During the crosslinking reaction the polymer may form covalent bonds to carbon, but this is not a requirement of the invention. Preferably, the weight ratio of the cationic coating material to activated carbon filter particles is from about 1:10,000 to about 1:1, by weight.

V. Filters of the Present Invention

Referring to FIG. 1, an exemplary filter made in accordance with the present invention will now be described. The filter 20 comprises a housing 22 in the form of a cylinder having an inlet 24 and an outlet 26. The housing 22 can be provided in a variety of forms, shapes, sizes, and arrangements depending upon the intended use and desired performance of the filter 20, as known in the art. For example, the filter 20 can be an axial flow filter, wherein the inlet 24 and outlet 26 are disposed so that the liquid flows along the axis of the housing 22. Alternatively, the filter 20 can be a radial flow filter wherein the inlet 24 and outlet 26 are arranged so that the fluid (e.g., either a liquid, gas, or mixture thereof) flows along a radial of the housing 22. Either in axial or radial flow configuration, filter 20 may be preferably configured to accommodate a face area of at least about 0.5 in.$^2$ (3.2 cm$^2$), more preferably at least about 3 in.$^2$ (19.4 cm$^2$), and most preferably at least about 5 in.$^2$ (32.2 cm$^2$), and preferably a filter depth of at least about 0.125 in. (0.32 cm) of at least about 0.25 in. (0.64 cm), more preferably at least about 0.5 in. (1.27 cm), and most preferably at least about 1.5 in. (3.81 cm). For radial flow filters, the filter length may be at least 0.25 in. (0.64 cm), more preferably at least about 0.5 in. (1.27 cm), and most preferably at least about 1.5 in. (3.81 cm). Still further, the filter 20 can include both axial and radial flow sections.

The housing may also be formed as part of another structure without departing from the scope of the present invention. While the filters of the present invention are particularly suited for use with water, it will be appreciated that other fluids (e.g., air, gas, and mixtures of air and liquids) can be used. Thus, the filter 20 is intended to represent a generic liquid filter or gas filter. The size, shape, spacing, alignment, and positioning of the inlet 24 and outlet 26 can be selected, as known in the art, to accommodate the flow rate and intended use of the filter 20. Preferably, the filter 20 is configured for use in residential or commercial potable water applications, including, but not limited to, whole house filters, refrigerator filters, portable water units (e.g., camping gear, such as water bottles), faucet-mount filters, under-sink filters, medical device filters, industrial filters, air filters, etc. Examples of filter configurations, potable water devices, consumer appliances, and other water filtration devices suitable for use with the present invention are disclosed in U.S. Pat. Nos. 5,527,451, 5,536,394, 5,709,794, 5,882,507, 6,103,114, 4,969,996, 5,431,813, 6,214,224, 5,957,034, 6,145,670, 6,120,685, and 6,241,899, the substances of which are incorporated herein by reference. For potable water applications, the filter 20 may be preferably configured to accommodate a flow rate of less than about 8 L/min, or less than about 6 L/min, or between about 2 L/min and about 4 L/min, and the filter may contain less than about 2 kg of filter material, or less than about 1 kg of filter material, or less than about 0.5 kg of filter material. Further, for potable water applications, the filter 20 may be preferably configured to accommodate an average fluid residence time of at least about 1 s, preferably at least about 3 s, preferably at least about 5 s, more preferably at least about 10 s, and most preferably at least about 15 s. Still further, for potable water applications, the filter 20 may be preferably configured to accommodate a filter material pore volume of at least about 0.4 cm$^3$, preferably at least about 4 cm$^3$, more preferably at least about 14 cm$^3$, and most preferably at least about 25 cm$^3$.

The filter 20 also comprises a filter material 28 which may be used in combination with other filter systems including reverse osmosis systems, ultra-violet light systems, ionic exchange systems, electrolyzed water systems, and other water treatment systems known to those with skill in the art.

The filter 20 also comprises a filter material 28, wherein the filter material 28 includes one or more filter particles (e.g., fibers, granules, etc.). In addition to the microporous particles of the filter materials of the present invention, one or more of the filter particles can be mesoporous, more preferably mesoporous and basic, and most preferably mesoporous, basic and reduced oxygen and possess the characteristics previously discussed. The microporous; mesoporous; or mesoporous and basic; or mesoporous, basic and reduced oxygen activated carbon filter material 28 can be coated either partially or in its entirety with silver, a silver containing material, any of the cationic polymer coating materials defined above, or combinations thereof. The microporous; mesoporous; or mesoporous and basic; or mesoporous, basic and reduced oxygen activated carbon filter material 28 can be combined with other materials selected from the group consisting of activated carbon powders, activated carbon granules, activated carbon fibers, carbon nanotubes, activated carbon nanotubes, single-wall carbon nanotubes (SWNT), multi-wall carbon nanotubes (MWNT), zeolites, activated alumina, magnesia, activated magnesia, diatomaceous earth, silver particles, activated silica, hydrotalcites, glass, metal-organic framework materials (MOF), glass particles or fibers, synthetic polymer nanofibers, natural polymer nanofibers, polyethylene fibers, polypropylene fibers, ethylene maleic anhydride copolymer fibers, sand, clay and mixtures thereof.

The other materials can be coated either partially or in their entirety with silver, a silver containing material, any of the cationic coating materials defined above, or combinations thereof. Examples of filter materials and combinations of filter materials that microporous and mesoporous and basic activated carbon may be combined with are disclosed in U.S. Pat. Nos. 6,274,041, 5,679,248, which are herein incorporated by reference, and U.S. patent application Ser. No. 09/628,632, which is herein incorporated by reference. As previously discussed, the filter material can be provided in either a loose or interconnected form (e.g., partially or wholly bonded by a polymeric binder or other means to form an integral structure).

The filter material may be used for different applications (e.g., use as a pre-filter or post-filter) by varying the size, shape, complex formations, charge, porosity, surface structure, functional groups, etc. of the filter particles as discussed above. The filter material may also be mixed with other materials, as just described, to suit it for a particular use. Regardless of whether the filter material is mixed with other materials, it may be used as a loose bed, a block (including a co-extruded block as described in U.S. Pat. No. 5,679,248, which is herein incorporated by reference), and mixtures thereof. Preferred methods that might be used with the filter material include forming a block filter made by ceramic-carbon mix (wherein the binding comes from the firing of the ceramic), using powder between non-wovens as described in U.S. Pat. No. 6,077,588, which is herein incorporated by reference, using the green strength method as described in U.S. Pat. No. 5,928,588, which is herein incorporated by reference, activating the resin binder that forms the block, which is herein incorporated by reference, or by using a resistive heating method as described in PCT Application Serial No. WO 98/43796.

VI. Filter Examples

EXAMPLE 1

Filter Containing Microporous and Mesoporous Activated Carbon Particles

About 5.5 g of microporous coconut carbon supplied from Barnebey Sutcliffe is mixed with 13.0 g of Nuchar® RGC mesoporous and basic activated carbon powder (with $D_{V,0.5}$ equal to about 45 μm) from MeadWestvaco Corp. of Covington, Va., which is then mixed with about 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. Before mixing, the mesoporous activated carbon particles are coated with poly diallyl dimethyl ammonium chloride (polyDADMAC), and the coating is dried. The mixed powders are then poured into a circular aluminum mold with about 3 in. (about 7.62 cm) internal diameter and about 0.5 in. (about 1.27 cm) depth. The mold is closed and placed in a heated press with platens kept at about 204° C. for 1 h. Then, the mold is allowed to cool to room temperature, opened, and the axial flow filter is removed. The characteristics of the filter are: face area: about 45.6 cm$^2$; filter depth: about 1.27 cm; filter total volume: about 58 mL; filter porosity (for pores greater than about 0.1 μm): about 0.43; and filter material pore volume (for pores greater than about 0.1 μm): about 25 mL (as measured by mercury porosimetry). The filter is placed in the Teflon® housing described in the test procedures below. When the flow rate is about 200 mL/min, the pressure drop of this filter is about 17 psi (about 1.2 bar, 0.12 MPa) for about the first 2,000 filter pore volumes.

EXAMPLE 2

Filter Containing Microporous and Mesoporous Activated Carbon Particles

About 13.0 g of microporous coconut carbon supplied from Barnebey Sutcliffe is mixed with 13.0 g of mesoporous basic activated carbon powder (with $D_{V,0.5}$ equal to about 92 μm) is mixed with 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. Before mixing, the mesoporous activated carbon particles are coated with poly diallyl dimethyl ammonium chloride (polyDADMAC), and the coating dried. The mixed powders are then poured into a circular aluminum mold with about 3 in. (about 7.62 cm) internal diameter and about 0.5 in. (about 1.27 cm) depth. The mold is closed and placed in a heated press with platens kept at about 204° C. for 1 h. Then, the mold is allowed to cool to room temperature, is opened, and the axial flow filter is removed. The characteristics of the filter are: face area: about 45.6 cm$^2$; filter depth: about 1.27 cm; filter total volume: about 58 mL; filter porosity (for pores greater than about 0.1 μm): about 0.44; and filter material pore volume (for pores greater than about 0.1 μm): about 25.5 mL (as measured by mercury porosimetry). The filter is placed in the Teflon® housing described in the test procedures below. When the flow rate is about 200 mL/min, the pressure drop of this filter is about 17 psi (about 1.2bar, about 0.12 MPa) for about the first 2,000 filter pore volumes.

EXAMPLE 3

TTHM, Viruses and Bacteria Removal for Filters Containing Microporous and Mesoporous Activated Carbon Particles Filters made according to Examples 1 and 2 above, and filters made by similar methods but using different blends of microporous and mesoporous activated carbon particles are tested for their removal of TTHM, MS-2 bacteriophages and *Raoultella terrigena* (R. t.) bacteria. The filters were wrapped with a single ply of uncharged nylon, having openings of 0.65 μm (BLA 065 supplied by Cuno, Inc., Meriden Conn.). A filter containing only mesoporous activated carbon and a filter containing only microporous activated carbon particles are also tested. The results of such a test are given in Table 3 below. Those skilled in the art of water filter production will appreciated that the conditions of such a test will depend on the filter volume, type of flow (e.g. axial, radial or other), and the type of carbon used. One such protocol is supplied by the U.S. Environmental Protection Agency (EPA) in 1987, in the "*Guide Standard and Protocol for Testing Microbiological Water Purifiers*". The protocol establishes minimum requirements regarding the performance of drinking water treatment systems that are designed to reduce specific health related contaminants in public or private water supplies. The MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage demonstrates its ability to remove other viruses. Likewise, a filter's ability to remove TTHM is representative of its ability to remove general chemicals from liquids.

In Table 3 the mesoporous activated carbon particles are different varieties of RGC carbon available from the MeadWestvaco Co. The nPSD carbon is Nuchar® RGC activated carbon that has been processed to remove certain large and small particles to produce a plurality of particles having a narrow particle size distribution (nPSD). The microporous carbon is coconut based carbon that is commercially available from Barnebey Sutcliffe. The filter is injected with chloroform (i.e., TTHM surrogate as suggested in ANSI Standard 53-2002), R. t. bacteria, and MS-2 bacteriophages, and removal efficiencies are measured at various points in time, some of which are shown below.

The TTHM efficiency is measured by the breakthrough, or how many gallons of contaminated water pass through the filter before TTHM are detected in the effluent. As can be seen in Table 3, for filters containing 0-20% microporous activated carbon particles, an average of 70 gallons of water passes through the filters before TTHM are detected. But at 30% microporous carbon particles the amount of water that passes through the filter before TTHM are detected more than doubles to 160 gallons in one test and 100 gallons or more for other filters. These results, especially the sharp increase in TTHM removal at about 25% microporous activated carbon content, are surprising and unexpected to those skilled in the art.

The R. t. and MS-2 removal rate is measured in log removal as defined above. As can be seen, the log removal for R. t. is approximately 7 log, for all of the filters from day 1 to day 16, except for the filter containing 100% microporous activated carbon particles. For this filter, the R. t. removal dropped from about 6 log at day 1 to about 3.7 at day 5, to about 2.3 at day 9, and to about 1.5 log at day 16. Likewise, the log removal for MS-2 is approximately 4-5 log, for all of the filters from day 1 to day 16, except for the filter containing 100% microporous activated carbon particles. For this filter the MS-2 removal started at about 1 log and remained at that level throughout the test. While the relatively poor removal of MS-2 and R. t. for the 100% microporous activated carbon filter is not surprising to those skilled in the art, what is surprising and unexpected is that filters with over 50% microporous carbon particles retain excellent removal for these viruses and bacteria. That is, it is indeed surprising and unexpected that a mixture of microrporous and mesoporous activated carbon particles when blended in a specific ratio can retain the qualities of each particle type.

TABLE 3

| | Micro-Porous Carbon Content % total carbon | TTHM gal | Pressure Drop at 2 Lpm psi | BOL Flow Rate Lpm | DAY 1 log | DAY 5 log | DAY 9 log | DAY 16 log |
|---|---|---|---|---|---|---|---|---|
| | | | | R.t. | | | | |
| 100% nPSD RGC coated with pDADMAC | 0 | 80 | 24 | ~2 | 7 | 6.6 | 6.8 | 6.6 |
| 100% RGC -55 coated with pDADMAC | 0 | 60 | 56 | ~2 | 7 | 6.7 | 6.8 | 7 |
| 80% nPSD RGC coated with pDADMAC | 20 | 70 | ~28 | ~2 | 7.3 | 6.6 | 7.3 | 7 |
| 70% nPSD RGC coated with pDADMAC | 30 | 160 | 34 | 2 | 7.2 | 7.1 | 6.9 | 7.3 |
| 35% 80X325 RGC + 35% RGC -55, both coated with pDADMAC | 30 | 100 | 37 | ~2 | 7.3 | 6.6 | 7.3 | 7 |
| 50% nPSD RGC coated with pDADMAC | 50 | 110 | 30 | 2.2 | 7.1 | 6.9 | 6.2 | 7 |
| 50% nPSD RGC coated with pDADMAC | 50 | 110 | 32 | 2.2 | 7.1 | 7.2 | 6.8 | 7 |
| 0% nPSD RGC coated with Pdadmac* | 100 | 150 | 26 | 2.1 | 6.6 | 3.7 | 2.3 | 1.5 |
| | | | | MS-2 | | | | |
| 100% nPSD RGC coated with pDADMAC | 0 | 80 | 24 | ~2 | 5 | 5 | 4.8 | 4.6 |

TABLE 3-continued

| | Micro-Porous Carbon Content % total carbon | TTHM gal | Pressure Drop at 2 Lpm psi | BOL Flow Rate Lpm | DAY 1 log | DAY 5 log | DAY 9 log | DAY 16 log |
|---|---|---|---|---|---|---|---|---|
| 100% RGC -55 coated with pDADMAC | 0 | 60 | 56 | ~2 | 4.7 | 4.8 | 4.1 | 5.1 |
| 80% nPSD RGC coated with pDADMAC | 20 | 70 | ~28 | ~2 | 5.1 | 4.9 | 5 | 4.7 |
| 70% nPSD RGC coated with pDADMAC | 30 | 160 | 34 | 2. | 4 | 4.6 | 4.6 | 4.7 |
| 35% 80X325 RGC + 35% RGC -55, both coated with pDADMAC | 30 | 100 | 37 | ~2 | 5.1 | 4.9 | 5 | 4.7 |
| 50% nPSD RGC coated with pDADMAC | 50 | 110 | 30 | 2.2 | 4.9 | 4.5 | <4 | 4.6 |
| 50% nPSD RGC coated with pDADMAC | 50 | 110 | 32 | 2.2 | 4.6 | 4.6 | 4.1 | 5.7 |
| 0% nPSD RGC coated with pDADMAC* | 100 | 150 | 26 | 2.1 | 1 | 1.1 | 1.2 | 1.2 |

*No nylon wrap was used on the filter in this test.

VII Kits

The present invention may additionally include information that will communicate to the consumer, by words and/or by pictures, that use of carbon filter particles and/or filter material of the present invention will provide benefits which include removal of microorganisms, and this information may include the claim of superiority over other filter products. In a highly desirable variation, the information may include that use of the invention provides for reduced levels of nano-sized microorganisms. Accordingly, the use of packages in association with information that will communicate to the consumer, by words and or by pictures, that use of the invention will provide benefits such as potable, or more potable water as discussed herein, is important. The information can include, e.g., advertising in all of the usual media, as well as statements and icons on the package, or the filter itself, to inform the consumer. More specifically, either the package or a housing for the filter can contain information that the filter or filter material provides: bacterial reduction; virus reduction; microbial reduction; bacterial removal; virus removal; microbial removal; killing of bacteria, killing of viruses, killing of microbials, TTHM removal, TTHM reduction, or any combination of these.

The embodiments described herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A filter comprising:

(a) a housing having an inlet and an outlet; and (b) a filter material disposed within the housing, the filter material comprising:

(i) from about 25% to about 75%, by weight, of a plurality of filter particles comprising microporous activated carbon, wherein the sum of the mesopore and macropore volumes of the filter particles is less than 0.12 mL/g, and wherein mesopore means an intra-particle pore having a diameter between 2 nm and 50 nm, and macropore means an intra-particle pore having a diameter greater than 50 nm, and (ii) from about 25% to about 75%, by weight, of a plurality of filter particles comprising mesoporous wood activated carbon, wherein:

A. the sum of the mesopore and macropore volumes of the plurality filter particles comprising mesoporous wood activated carbon is between about 0.2 mL/g and about 2 mL/g, wherein mesopore means an intra-particles pore having a diameter between 2 nm and 50 nm, and macropore means an intra-particle pore having a diameter greater than 50 nm, and B. the ratio of the sum of the sum of the mesopore and macropore volumes to the total pore volume of the plurality of filter particles comprising mesoporous wood activated carbon is greater than about 0.3;

wherein the filter has a Filter Bacteria Log Removal of greater than about 2 logs and a Filter Viruses Log Removal of greater than 1 log.

2. The filter of claim 1, wherein the total pore volume of the plurality of filter particles comprising mesoporous wood activated carbon is greater than about 0.4 mL/g and less than about 3 mL/g.

3. The filter of claim 1, wherein the filter material is operable to remove trihalomethanes up to and past the passage of 85 gallons of water.

4. The filter of claim 1, wherein the plurality of filter particles comprising mesoporous wood activated carbon are present in the filter material at a concentration of from about 30% to about 55%, by weight.

5. The method of claim 4, wherein the plurality of filter particles comprising mesoporous wood activated carbon are present in the filter material at a concentration of from about 30% to about 50%, by weight.

6. The filter of claim 1, wherein the plurality of filter particles comprising microporous activated carbon are coconut based activated carbon particles.

7. The filter of claim 1, wherein at least a portion of the plurality of the filter particles comprising mesoporous wood activated carbon and microporous activated carbon are coated at least partially or entirely with a cationic polymer selected from the group consisting of: polyvinylamine, poly(N-methylvinylamine), polyallylamine, polyallyldimethylamine, polydiallylmethylamine, poly diallyl dimethyl ammonium chloride (pDADMAC), polyvinylpyridinium chloride, poly (2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), polyvinyl(acrylamide-co-dimethylaminoethylmethacrylate), polyethyleneimine, polylysine, poly(propylene)imine dendrimer (DAB-Am) and Poly(amido amine) (PAMAM) dendrimers, polyaminoamides, polyhexamethylenebiguandide, polydimethylamine-epichlorohydrine, aminopropyltriethoxysilane, N-(2-aminoethyl)-3-aminopropyltrimethoxysilane, N-trimethoxysilylpropyl -N,N,N-trimethylammonium chloride, bis(trimethoxysilylpropyl)amine, chitosan, grafted starch, the product of alkylation of polyethyleneimine by methylchloride, the product of alkylation of polyaminoamides with epichlorohydrine, cationic polyacrylamide with cationic monomers, dimethyl aminoethyl acrylate methyl chloride (AETAC), dimethyl aminoethyl methacrylate methyl chloride (METAC), acrylamidopropyl trimethyl ammonium chloride (APTAC), methacryl amidopropyl trimethyl ammonium chloride (MAPTAC), diallyl dimethyl ammonium chloride (DADMAC), ionenes, silanes and mixtures thereof.

8. The filter of claim 7, wherein the cationic polymer is poly diallyl dimethyl ammonium chloride (pDADMAC).

9. A filter comprising:
(a) a housing having an inlet and an outlet; and
(b) a filter material disposed within the housing, the filter material comprising:
(i) from about 25% to about 75%, by weight, of a plurality of filter particles comprising microporous activated carbon, wherein the sum of the mesopore and macropore volumes of the filter particles is less than 0.12 mL/g, and wherein mesopore means an intra-particle pore having a diameter between 2 nm and 50 nm, and macropore means an intra-particle pore having a diameter greater than 50 nm, and
(ii) from about 25% to about 75%, by weight, of a plurality of filter particles comprising mesoporous activated carbon, wherein:
A. the sum of the mesopore and macropore volumes of the plurality filter particles comprising mesoporous activated carbon is between about 0.2 mL/g and about 2 mL/g, wherein mesopore means an intra-particles pore having a diameter between 2 nm and 50 nm, and macropore means an intra-particle pore having a diameter greater than 50 nm,
B. the ratio of the sum of the sum of the mesopore and macropore volumes to the total pore volume of the plurality of filter particles comprising mesoporous activated carbon is greater than about 0.3, and
C. the total pore volume of the plurality of filter particles comprising mesoporous activated carbon is greater than about 0.4 mL/g and less than about 3 mL/g;
wherein the filter has a Filter Bacteria Log Removal of greater than about 2 logs and a Filter Viruses Log Removal of greater than 1 log.

10. The filter of claim 9, wherein the filter material is operable to remove trihalomethanes up to and past the passage of 85 gallons of water.

11. The filter of claim 10, wherein the plurality of filter particles comprising mesoporous activated carbon are present in the filter material at a concentration of from about 30% to about 55%, by weight.

12. The filter of claim 9, wherein the plurality of filter particles comprising microporous activated carbon are coconut based activated carbon particles and the plurality of filter particles comprising mesoporous activated carbon are wood based activated carbon particles.

13. The filter of claim 9, wherein at least a portion of the plurality of the filter particles comprising mesoporous activated carbon and microporous activated carbon are coated at least partially or entirely with poly diallyl dimethyl ammonium chloride (pDADMAC).

14. A method of removing trihalomethanes, bacteria, and viruses, comprising:
providing a filter comprising:
(a) a housing having an inlet and an outlet; and
(b) a filter material disposed within the housing, the filter material comprising:
(i) from about 25% to about 75%, by weight, of a plurality of filter particles comprising microporous activated carbon, wherein the sum of the mesopore and macropore volumes of the filter particles is less than 0.12 mL/g, and wherein mesopore means an intra-particle pore having a diameter between 2 nm and 50 nm, and macropore means an intra-particle pore having a diameter greater than 50 nm, and
(ii) from about 25% to about 75%, by weight, of a plurality of filter particles comprising mesoporous activated carbon, wherein:
A. the sum of the mesopore and macropore volumes of the plurality of filter particles comprising mesoporous activated carbon is between about 0.2 mL/g and about 2 mL/g, wherein mesopore means an intra-particles pore having a diameter between 2 nm and 50 nm, and macropore means an intra-particle pore having a diameter greater than 50 nm, and
B. the total pore volume of the plurality of filter particles comprising mesoporous activated carbon is greater than about 0.4 mL/g and less than about 3 mL/g; and
passing water into the inlet and through the filter material such that the filter material removes trihalomethanes up to and past the passage of 85 gallons of water and bacteria and viruses at a Filter Bacteria Log Removal of greater than about 2 logs and a Filter Viruses Log Removal of greater than 1 log.

15. The method of claim 14, wherein the filter material further comprises other materials selected from the group consisting of activated carbon powders, activated carbon granules, activated carbon fibers, zeolites, activated alumina, activated magnesia, diatomaceous earth, activated silica, hydrotalcites, glass, polyethylene fibers, polypropylene fibers, ethylene maleic anhydride copolymer fibers, sand, clay and mixtures thereof.

16. The method of claim 15, wherein at least a portion of the other materials are coated with a material selected from the group consisting of silver, a silver containing material, a cationic polymer and mixtures thereof.

17. The method of claim 14, wherein at least a portion of the plurality of filter particles comprising mesoporous activated carbon and microporous activated carbon are coated with poly diallyl dimethyl ammonium chloride (pDADMAC).

18. The method of claim 14, wherein the step of removing trihalomethanes via the filter material comprises removing trihalomethanes via the filter material up to and past the passage of 90 gallons of water.

19. The method of claim 14, wherein the step of removing trihalomethanes via the filter material comprises removing trihalomethanes via the filter material up to and past the passage of 95 gallons of water.

20. The method of claim 14, wherein the step of removing trihalomethanes via the filter material comprises removing trihalomethanes via the filter material up to and past the passage of 100 gallons of water.

* * * * *

UNITED STATES PATENT AND TRADEMARK OFFICE

CERTIFICATE OF CORRECTION

PATENT NO. : 8,119,012 B2
APPLICATION NO. : 13/041981
DATED : February 21, 2012
INVENTOR(S) : Jeannine Rebecca Bahm et al.

It is certified that error appears in the above-identified patent and that said Letters Patent is hereby corrected as shown below:

Col. 24, Claim 1, Line 53, “intra-particles pore” should read --intra-particle pore--

Col. 25, Claim 9, Line 65, “intra-particles pore” should read --intra-particle pore--

Col. 26, Claim 14, Line 50, “intra-particles pore” should read --intra-particle pore--

Signed and Sealed this
Fourth Day of September, 2012

David J. Kappos
*Director of the United States Patent and Trademark Office*